(12) United States Patent
Jiang et al.

(10) Patent No.: US 10,362,215 B2
(45) Date of Patent: Jul. 23, 2019

(54) MICROSCOPIC THREE-DIMENSIONAL MEASUREMENT SYSTEM AND METHOD BASED ON MOVING DIAPHRAGM

(71) Applicant: Ningbo University, Ningbo, Zhejiang (CN)

(72) Inventors: Gangyi Jiang, Zhejiang (CN); Mei Yu, Zhejiang (CN); Shengli Fan, Zhejiang (CN); Yigang Wang, Zhejiang (CN)

(73) Assignee: Ningbo University, Ningbo, Zhejiang (CN)

( * ) Notice: Subject to any disclaimer, the term of this patent is extended or adjusted under 35 U.S.C. 154(b) by 0 days.

(21) Appl. No.: 15/893,692

(22) Filed: Feb. 12, 2018

(65) Prior Publication Data

US 2018/0198972 A1  Jul. 12, 2018

(30) Foreign Application Priority Data

Nov. 17, 2017 (CN) .......................... 2017 1 1144614

(51) Int. Cl.
*G02B 21/22* (2006.01)
*H04N 5/232* (2006.01)
(Continued)

(52) U.S. Cl.
CPC ..... *H04N 5/23212* (2013.01); *G02B 21/0016* (2013.01); *G02B 21/26* (2013.01); *G02B 21/362* (2013.01); *G06T 7/593* (2017.01); *H04N 5/238* (2013.01); *H04N 5/2354* (2013.01); *H04N 5/23216* (2013.01); *H04N 13/239* (2018.05); *H04N 13/246* (2018.05);
(Continued)

(58) Field of Classification Search
CPC ....... H04N 5/23212; H04N 2013/0081; H04N 13/271; H04N 13/275; H04N 5/23216; H04N 5/238; H04N 5/2354; G02B 21/0016; G02B 21/26; G02B 21/362; G06T 7/593; G06T 2207/10056; G06T 2200/08
See application file for complete search history.

(56) References Cited

U.S. PATENT DOCUMENTS

2004/0264764 A1* 12/2004 Kochi .................... G01B 15/04
                                                         382/154
2007/0222979 A1*  9/2007 Van Der Laan ..... G01N 21/278
                                                         356/243.1

(Continued)

*Primary Examiner* — Howard D Brown, Jr.

(57) ABSTRACT

The present invention discloses a microscopic three-dimensional measurement system and method based on a moving diaphragm. The present invention adds the diaphragm into the existing optical microscopic imaging system to limit light irradiation angle during imaging for reducing the diameter of blur circle, which extends the depth of field and the depth measurement range, so as to achieve the three-dimensional measurement of large-size objects to be measured. Through changing the position of the added diaphragm, two images with different light incident directions are obtained, which is similar to binocular stereo vision, and then the disparity map is used to predict the depth, so as to carry out the 3D scene reconstruction. Since the depth of field of the imaging system is enlarged and the imaging model has certain non-linear characteristics, the present invention uses quadratic function to express the non-linearity, which reduces the measurement error.

3 Claims, 4 Drawing Sheets

(51) Int. Cl.

| | |
|---|---|
| *G06T 7/593* | (2017.01) |
| *H04N 5/235* | (2006.01) |
| *H04N 5/238* | (2006.01) |
| *G02B 21/36* | (2006.01) |
| *G02B 21/26* | (2006.01) |
| *H04N 13/271* | (2018.01) |
| *H04N 13/275* | (2018.01) |
| *G02B 21/00* | (2006.01) |
| *H04N 13/246* | (2018.01) |
| *H04N 13/239* | (2018.01) |
| *H04N 13/00* | (2018.01) |

(52) U.S. Cl.
CPC ......... *H04N 13/271* (2018.05); *H04N 13/275* (2018.05); *G06T 2200/08* (2013.01); *G06T 2207/10056* (2013.01); *H04N 2013/0081* (2013.01)

(56) References Cited

U.S. PATENT DOCUMENTS

| | | | | |
|---|---|---|---|---|
| 2009/0078888 | A1* | 3/2009 | Namba | B82Y 10/00 250/491.1 |
| 2017/0199365 | A1* | 7/2017 | Czaniera | G02B 5/005 |

* cited by examiner

MICROSCOPIC THREE-DIMENSIONAL MEASUREMENT SYSTEM AND METHOD BASED ON MOVING DIAPHRAGM

CROSS REFERENCE OF RELATED APPLICATION

The present invention claims priority under 35 U.S.C. 119(a-d) to CN 201711144614.7, filed Nov. 17, 2017.

BACKGROUND OF THE PRESENT INVENTION

Field of Invention

The present invention relates to a microscopic three-dimensional measurement technology, and more particularly to a microscopic three-dimensional measurement system and method based on a moving diaphragm.

Description of Related Arts

The optical microscope is a commonly used three-dimensional micro-measuring instrument, which is used to measure three-dimensional coordinates of space points and obtain experimental data in biomedicine, quality inspection and industrial micromanipulation, for facilitating quantitative analysis, so as to improve the product quality, improve the manufacturing process and ensure the accuracy of scientific research.

Currently, digital stereomicroscopes are often used to achieve microscopic three-dimensional measurements. The computer acquires left and right images taken by a digital stereomicroscope and performs the parameter calibration, stereo matching and three-dimensional reconstruction using existing stereoscopic vision measurement methods, so as to finally achieve the purpose of three-dimensional measurement.

However, the optical microscope has disadvantages of small field of view, severe defocused phenomenon and shallow depth of field. Therefore, if the size of the three-dimensional object to be observed exceeds the shallow depth of field of the optical microscope, the clear left images and the clear right images of the three-dimensional object to be observed are difficult to be obtained, which eventually leads that the three-dimensional measurement cannot be achieved.

SUMMARY OF THE PRESENT INVENTION

A technical problem to be solved provided by the present invention is to provide a microscopic three-dimensional measurement system and method based on a moving diaphragm, both of which utilize the diaphragm to extend the depth of field and the depth measurement range, so as to achieve the three-dimensional measurement of large-size objects to be measured.

Technical solutions adopted by the present invention to solve the above technical problems are as follows.

A microscopic three-dimensional measurement system based on a moving diaphragm comprises: an optical microscope, a camera installed on the optical microscope aligned with an eyepiece of the optical microscope, a lifting platform for horizontally placing a dot calibration board, and a computer, wherein the optical microscope is disposed above the dot calibration board for allowing the eyepiece of the optical microscope to just face towards the dot calibration board, an output end of the camera is connected with the computer, a drive motor of the lifting platform is connected with the computer; a diaphragm, which is able to horizontally move, is disposed between the eyepiece of the optical microscope and the dot calibration board; an optical axis of the optical microscope coincides with a moving trajectory of the lifting platform, is perpendicular to both the dot calibration board and a moving trajectory of the diaphragm.

Preferably, the microscopic three-dimensional measurement system further comprises a sliding base for driving the diaphragm to horizontally move, wherein a drive motor of the sliding base is connected with the computer.

Also, the present invention provides a microscopic three-dimensional measurement method based on a moving diaphragm, which comprises steps of:

(1) coinciding an optical axis of an optical microscope with a moving trajectory of a lifting platform; horizontally placing a dot calibration board on a top surface of the lifting platform and allowing the dot calibration board to be perpendicular to the optical axis of the optical microscope; allowing a moving trajectory of a diaphragm installed on a sliding base to be perpendicular to the optical axis of the optical microscope; placing the diaphragm between an eyepiece of the optical microscope and the dot calibration board, wherein a center distance between two adjacent solid dots in the dot calibration board is defined as e, a diameter of every solid dot in the dot calibration board is defined as d, d<e, a unit of both the d and the e is mm, a diameter of an aperture of the diaphragm is defined as D, D∈[1,5] and a unit of the D is mm;

(2) determining an initial position of the aperture of the diaphragm, which comprises positioning a center of the aperture of the diaphragm on the optical axis of the optical microscope through controlling the sliding base; moving the diaphragm left horizontally for a distance L through controlling the sliding base, which means that a distance between the center of the aperture of the diaphragm and the optical axis of the optical microscope is L; determining a current position of the center of the aperture of the diaphragm to be the initial position of the aperture of the diaphragm and recording as $T_L$, wherein L∈[2, 4], and a unit of the L is mm;

determining an initial position of the dot calibration board, which comprises controlling the lifting platform to drive the dot calibration board to move vertically and stopping the vertical movement of the lifting platform when a dot calibration board image observed by an observer from a computer is the clearest; controlling the lifting platform to drive the dot calibration board to move vertically and upwardly, stopping the vertical and upward movement of the lifting platform when the dot calibration board image observed by the observer from the computer changes from the clearest to just fuzzy, recording a current vertical upward moving distance of the lifting platform as $Z_S$, determining a current position of the dot calibration board to be the initial position of the dot calibration board and recording as $P_0$, wherein a unit of the $Z_S$ is mm;

(3) when the dot calibration board is at the initial position $P_0$, respectively placing four tiny markers at four solid dots on the dot calibration board; making a shape, formed by taking centers of the four solid dots where the four tiny markers are as vertexes, always a rectangle; the observer observing the dot calibration board image displayed by the computer; moving the four tiny markers; displaying the rectangle, which is defined by taking centers of the four solid dots where the four tiny markers are as vertexes, in the dot calibration board image with a largest area and recording as A';

(4) controlling the sliding base to move the diaphragm right horizontally for a distance of 2L and recording a current position of the aperture of the diaphragm as $T_R$; and then the observer observing the dot calibration board image displayed by the computer; moving the four tiny markers; displaying the rectangle, which is defined by taking the centers of the four solid dots where the four tiny markers are as vertexes, in the dot calibration board image with a largest area and recording as A, saving a current dot calibration board image and recording as $S_{0,T_R}$; and then controlling the sliding base to move the diaphragm left horizontally for a distance of 2L, positioning the aperture of the diaphragm at a position of $T_L$, saving a current dot calibration board image and recording as $S_{0,T_L}$, wherein: the A is included in the A', an amount of columns of solid dots in a width direction of the A on the dot calibration board is defined as W, and an amount of rows of solid dots in a height direction of the A on the dot calibration board is defined as H, which means that there are totally W×H solid dots of the A on the dot calibration board, both the W and the H are positive integers;

(5) taking a top left corner vertex of the A on the dot calibration board as a coordinate origin O, defining an X positive axis by a direction which points at centers of solid dots at a same row, defining a Y positive axis by a direction which points to centers of solid dots at a same column, defining a vertically downwardly moving direction of the lifting platform as a Z positive axis, so as to establish a three-dimensional coordinate system OXYZ;

respectively performing binary processing on the $S_{0,T_L}$ and the $S_{0,T_R}$, obtaining binary images respectively corresponding to the $S_{0,T_L}$ and the $S_{0,T_R}$; processing the binary images of the $S_{0,T_L}$ through a region growing algorithm, obtaining both every solid dot region and multiple candidate coordinate positions of a center of the every solid dot region in the $S_{0,T_L}$; similarly, processing the binary images of the $S_{0,T_R}$ through the region growing algorithm, obtaining both every solid dot region and multiple candidate coordinate positions of a center of the every solid dot region in the $S_{0,T_R}$; and then determining any one of the multiple candidate coordinate positions of the center of the every solid dot region within a rectangle area in the $S_{0,T_L}$ corresponding to the A, to a final coordinate position of the center of the solid dot region; recording a final coordinate position of a center of a $i^{th}$ column and $j^{th}$ row solid dot region within the rectangle area in the $S_{0,T_L}$ corresponding to the A as $(u_{l,i,j,0}, v_{l,i,j,0})$; similarly, determining any one of the multiple candidate coordinate positions of the center of the every solid dot region within a rectangle area in the $S_{0,T_R}$ corresponding to the A, to a final coordinate position of the center of the solid dot region; recording a final coordinate position of a center of a $i^{th}$ column and $j^{th}$ throw solid dot region within the rectangle area in the $S_{0,T_R}$ corresponding to the A as $(u_{r,i,j,0}, v_{r,i,j,0})$, wherein: both the i and the j are positive integers, $1 \le i \le W$, $1 \le j \le H$;

(6) controlling the lifting platform to drive dot calibration board to move vertically and downwardly for a distance of $\Delta\alpha$, recording a current position of the dot calibration board as $P_1$, recording a current dot calibration board image and recording as $S_{1,T_L}$; and then controlling the lifting platform to move right horizontally the diaphragm for a distance of 2L, positioning the aperture of the diaphragm at a position of $T_R$, saving a current dot calibration board image and recording as $S_{1,T_R}$; and then controlling the lifting platform to move left horizontally the diaphragm for a distance of 2L, positioning the aperture of the diaphragm at a position of $T_L$, wherein $\Delta\alpha \in (Z_S/100, Z_S/50)$, a unit of the $\Delta\alpha$ is mm;

(7) respectively performing binary processing on the $S_{1,T_L}$ and the $S_{1,T_R}$, obtaining binary images respectively corresponding to the $S_{1,T_L}$ and the $S_{1,T_R}$; processing the binary images of the $S_{1,T_L}$ through the region growing algorithm, obtaining both every solid dot region and multiple candidate coordinate positions of a center of the every solid dot region in the $S_{1,T_L}$; similarly, processing the binary images of the $S_{1,T_R}$ through the region growing algorithm, obtaining both every solid dot region and multiple candidate coordinate positions of a center of the every solid dot region in the $S_{1,T_R}$; and then according to the multiple candidate coordinate positions of the center of the every solid dot region within a rectangle area in the $S_{1,T_L}$ corresponding to the A, determining a final coordinate position of the center of the every solid dot region within the rectangle area in the $S_{1,T_L}$ corresponding to the A; recording a final coordinate position of a center of a $i^{th}$ column and $j^{th}$ row solid dot region within the rectangle area in the $S_{1,T_L}$ corresponding to the A as $(u_{l,i,j,1}, v_{l,i,j,1})$ wherein the $(u_{l,i,j,1}, v_{l,i,j,1})$ is a candidate coordinate position with a smallest Euclidean distance to the $(u_{l,i,j,0}, v_{l,i,j,0})$ in the multiple candidate coordinate positions of the center of the $i^{th}$ column and $j^{th}$ row solid dot region within the rectangle area in the $S_{1,T_L}$ corresponding to the A; similarly, according to the multiple candidate coordinate positions of the center of the every solid dot region within a rectangle area in the $S_{1,T_R}$ corresponding to the A, determining a final coordinate position of the center of the every solid dot region within the rectangle area in the $S_{1,T_R}$ corresponding to the A; recording a final coordinate position of a center of a $i^{th}$ column and $j^{th}$ row solid dot region within the rectangle area in the $S_{1,T_R}$ corresponding to the A as $(u_{r,i,j,1}, v_{r,i,j,1})$, wherein the $(u_{r,i,j,1}, v_{r,i,j,1})$ is a candidate coordinate position with a smallest Euclidean distance to the $(u_{r,i,j,0}, v_{r,i,j,0})$ in the multiple candidate coordinate positions of the center of the $i^{th}$ column and $j^{th}$ row solid dot region within the rectangle area in the $S_{1,T_R}$ corresponding to the A;

calculating three-dimensional coordinates on the three-dimensional coordinate system OXYZ of a center of every solid dot within the A on the dot calibration board after the lifting platform driving the dot calibration board to firstly move vertically and downwardly for a distance of $\Delta\alpha$, recording three-dimensional coordinates on the three-dimensional coordinate system OXYZ of a center of a $i^{th}$ column and $j^{th}$ row solid dot within the A on the dot calibration board after the lifting platform driving the dot calibration board to firstly move vertically and downwardly for the distance of $\Delta\alpha$ as $(x_{i,j,1}, y_{i,j,1}, z_{i,j,1})$, wherein $x_{i,j,1} = (i-1) \times e$, $y_{i,j,1} = (j-1) \times e$ and $z_{i,j,1} = 1 \times \Delta\alpha$; and then calculating a multi-aperture imaging bias corresponding to every solid dot within the A on the dot calibration board after the lifting platform driving the dot calibration board to firstly move vertically and downwardly for the distance of $\Delta\alpha$, recording a multi-aperture imaging bias corresponding to a $i^{th}$ column and $j^{th}$ row solid dot within the A on the dot calibration board after the lifting platform driving the dot calibration board to firstly move vertically and downwardly for the distance of $\Delta\alpha$ as $\Delta u_{i,j,1}$, here, $\Delta u_{i,j,1} = u_{l,i,j,1} - u_{r,i,j,1}$, wherein $x_{i,j,1}, y_{i,j,1}, z_{i,j,1}$ respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to firstly move vertically and downwardly for the distance of $\Delta\alpha$;

(8) repeating the steps (6) and (7) for (N−1) times, recording a current position of the dot calibration board as $P_k$ after the lifting platform drives the dot calibration board to move downwardly and vertically for $\Delta\alpha$ at a $k^{th}$ time, recording a current dot calibration board image as $S_{k,T_L}$; recording a dot calibration board image as $S_{k,T_R}$ after moving right horizontally the diaphragm for 2L; recording a final coordinate positions of a center of a $i^{th}$ column and $j^{th}$ row solid dot region within a rectangle area in the $S_{k,T_L}$ corresponding to the A as $(u_{l,i,j,k}, v_{l,i,j,k})$ wherein the $(u_{l,i,j,k}, v_{l,i,j,k})$ is a candidate coordinate position with a smallest Euclidean distance to the $(u_{l,i,j,k-1}, v_{l,i,j,k-1})$ in multiple candidate coordinate positions of the center of the $i^{th}$ column and $j^{th}$ row solid dot region within the rectangle area in the $S_{k,T_R}$ corresponding to the A; recording a final coordinate positions of a center of a $i^{th}$ column and $j^{th}$ row solid dot region within a rectangle area in the $S_{k,T_R}$ corresponding to the A as $(u_{r,i,j,k}, v_{r,i,j,k})$, wherein the $(u_{r,i,j,k}, v_{r,i,j,k})$ is a candidate coordinate position with a smallest Euclidean distance to the $(u_{r,i,j,k-1}, v_{r,i,j,k-1})$ in multiple candidate coordinate positions of the center of the $i^{th}$ column and $j^{th}$ row solid dot region within the rectangle area in the $S_{k,T_R}$ corresponding to the A; recording three-dimensional coordinates on the three-dimensional coordinate system OXYZ of a center of a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $(x_{i,j,k}, y_{i,j,k}, z_{i,j,k})$, wherein $x_{i,j,k}=(i-1)\times e$, $y_{i,j,k}=(j-1)\times e$ and $z_{i,j,k}=k\times\Delta\alpha$; and then recording a multi-aperture imaging bias corresponding to a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $\Delta u_{i,j,k}$, here, $\Delta u_{i,j,k} = u_{l,i,j,k} - u_{r,i,j,k}$, wherein N is a positive integer, $$N = \left\lfloor 2 \times \frac{Z_S}{\Delta\alpha} \right\rfloor,$$

"$\lfloor\ \rfloor$" represents a round downward operator, k is a positive integer, $1 \leq k \leq N$, $x_{i,j,k}, y_{i,j,k}, z_{i,j,k}$, respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to move vertically and downwardly at the $k^{th}$ time for the distance of $\Delta\alpha$;

(9) forming a data pair by combining the Z-axis coordinate on the three-dimensional coordinate system OXYZ of the center of every solid dot within the A on the dot calibration board after the lifting platform driving the dot calibration board to move vertically and downwardly every time for the distance of $\Delta\alpha$, with a corresponding multi-aperture imaging bias, recording the data pair formed by the $z_{i,j,k}$ and the $\Delta u_{i,j,k}$ as $(z_{i,j,k}, \Delta u_{i,j,k})$; and then through a quadratic polynomial, fitting N data pairs corresponding to every solid dot within the A on the dot calibration board, obtaining W×H relationships between the Z-axis coordinate on the three-dimensional coordinate system of the center of every solid dot within the A on the dot calibration board and a corresponding multi-aperture imaging bias, defining a relationship between the Z-axis coordinate $z_{i,j}$ on the three-dimensional coordinate system of the center of the $i^{th}$ column and $j^{th}$ row solid dot within the A on the dot calibration board and a corresponding multi-aperture imaging bias $\Delta u_{i,j}$ as $z_{i,j}=a_{i,j}\Delta u_{i,j}^2+b_{i,j}\Delta u_{i,j}+c_{i,j}$, wherein all of the $a_{i,j}$, the $b_{i,j}$ and the $c_{i,j}$ are coefficients obtained by fitting, there are totally (W×H) coefficients;

calculating a corresponding focal plane moving distance of every solid dot within the A on the dot calibration board after the lifting platform drives the dot calibration board to move downwardly and vertically every time for a distance of $\Delta\alpha$, recording a corresponding focal plane moving distance of the $i^{th}$ column and $j^{th}$ row solid dot within the A on the dot calibration board as $\Delta z_{i,j,k}$ after the lifting platform drives the dot calibration board to move vertically and downwardly at the $k^{th}$ time for the distance of $\Delta\alpha$, here, $\Delta z_{i,j,k}=z_{i,j,k}-c_{i,j}$; and then forming a data pair by combining a corresponding focal plane moving distance of every solid dot within the A on the dot calibration board after the lifting platform drives the dot calibration board to move vertically and downwardly every time for the distance of $\Delta\alpha$, with a corresponding multi-aperture imaging bias, recording the data pair formed by the $\Delta_{i,j,k}$ and $\Delta u_{i,j,k}$ as $(\Delta z_{i,j,k}, \Delta u_{i,j,k})$; and then through a quadratic polynomial, fitting N×W×H data pairs corresponding to all solid dots within the A on the dot calibration board, obtaining a relationship between a focal plane moving distance $\Delta z$ corresponding to any point on the dot calibration board and a corresponding multi-aperture imaging bias $\Delta u$, defining the relationship as $\Delta z = a\Delta u^2 + b\Delta u + c$, wherein all of the a, the b and the c are coefficients obtained by fitting;

according to the X-axis coordinate and the Y-axis coordinate on the three-dimensional coordinate system OXYZ of the center of every solid dot within the A on the dot calibration board after the lifting platform firstly drives the dot calibration board to move vertically and downwardly for the distance of $\Delta\alpha$, determining (W×H) three-dimensional scattered points and three-dimensional coordinates of an $i^{th}$ column and $j^{th}$ row three-dimensional scattered point to $(x_{i,j,1}, y_{i,j,1}, c_{i,j})$; and then through a plane fitting method, plane-fitting the (W×H) three-dimensional scattered points, obtaining a space plane with an equation of $z=b_1+b_2 x+b_3 y$, here, all of the $b_1$, the $b_2$ and the $b_3$ are coefficients obtained by fitting, (x,y,z) presents three-dimensional coordinates of space points in the three-dimensional coordinate system OXYZ, the x,y,z respectively represent an X-axis coordinate, a Y-axis coordinate and a Z-axis coordinate of every space point in the three-dimensional coordinate system OXYZ;

(10) determining a relationship, between corresponding coordinate positions (u,v) of any obtained point in the dot calibration board images and on the dot calibration board when the aperture of the diaphragm is at a position of $T_L$ after the lifting platform drives the dot calibration board move vertically and downwardly every time for the distance of $\Delta\alpha$, and a corresponding focal plane moving distance $\Delta z$ of the point on the dot calibration board, defining the relationship between the (u,v) and the $\Delta z$ as $$\begin{cases} u = a_f \times \Delta z^2 + b_f \times \Delta z + d_f \\ v = a_g \times \Delta z^2 + b_g \times \Delta z + d_g \end{cases},$$

here, $1 \leq u \leq W'$, $1 \leq v \leq H'$, W' represents a width of an obtained dot calibration board image when the aperture of the diaphragm is at a position of $T_L$ after the lifting platform drives the dot calibration board move vertically and downwardly every time for the distance of $\Delta\alpha$, H' represents a height thereof, all of the $a_f$, $b_f$, $d_f$, $a_g$, $b_g$, and $d_g$ are quadratic polynomial coefficients;

forming a data pair by combining an X-coordinate of a final coordinate position of a center of every solid dot region within a rectangle area corresponding to the A in the obtained dot calibration board image after the lifting platform drives the dot calibration board to move vertically and downwardly every time for the distance of $\Delta\alpha$, with a corresponding focal plane moving distance of every solid dot within the A on the dot calibration board, recording the data pair formed by $u_{l,i,j,k}$ and $\Delta z_{i,j,k}$ as $(u_{l,i,j,k},\Delta z_{i,j,k})$; and then through a quadratic polynomial, fitting N data pairs corresponding to every solid dot of both every solid dot region within a rectangle area corresponding to the A in the dot calibration board image and within the A on the dot calibration board, obtaining a relationship between an X-coordinate of a final coordinate position of a center of every solid region within a rectangle area corresponding to the A in the dot calibration board image, and a corresponding focal plane moving distance of every solid dot within the A on the dot calibration board; defining a relationship between an X-coordinate $u_{l,i,j}$ of a final coordinate position of a center of an $i^{th}$ column and $j^{th}$ row solid region within the rectangle area corresponding to the A in the dot calibration board image, and a corresponding focal plane moving distance $\Delta z_{i,j}$ of the $i^{th}$ column and $j^{th}$ row solid dot within the A on the dot calibration board as $u_{l,i,j}=a_{f,i,j}\times\Delta z_{i,j}^2+b_{f,i,j}\times\Delta z_{i,j}+d_{f,i,j}$, here, all of the $a_{f,i,j}$, $b_{f,i,j}$, and $d_{f,i,j}$ are coefficients obtained by fitting, there are totally (W×H) coefficients;

forming a data pair by combining a Y-coordinate of the final coordinate position of the center of every solid dot region within the rectangle area corresponding to the A in the obtained dot calibration board image after the lifting platform drives the dot calibration board to move vertically and downwardly every time for the distance of $\Delta\alpha$, with the corresponding focal plane moving distance of every solid dot within the A on the dot calibration board, recording the data pair formed by $v_{l,i,j,k}$ and $\Delta z_{i,j,k}$ as $(v_{l,i,j,k},\Delta z_{i,j,k})$; and then through the quadratic polynomial, fitting N data pairs corresponding to every solid dot of both every solid dot region within the rectangle area corresponding to the A in the dot calibration board image and within the A on the dot calibration board, obtaining a relationship between a Y-coordinate of the final coordinate position of the center of every solid region within the rectangle area corresponding to the A in the dot calibration board image, and the corresponding focal plane moving distance of every solid dot within the A on the dot calibration board; defining a relationship between a Y-coordinate $v_{l,i,j}$ of the final coordinate position of the center of the $i^{th}$ column and $j^{th}$ row solid region within the rectangle area corresponding to the A in the dot calibration board image, and the corresponding focal plane moving distance $\Delta z_{i,j}$ of the $i^{th}$ column and $j^{th}$ row solid dot within the A on the dot calibration board as $v_{l,i,j}=a_{g,i,j}\times\Delta z_{i,j}^2+b_{g,i,j}\times\Delta z_{i,j}+d_{g,i,j}$, here, all of the $a_{g,i,j}$, $b_{g,i,j}$ and $d_{g,i,j}$ are coefficients obtained by fitting, there are totally (W×H) coefficients, wherein $a_{f,i,j}$ and $b_{f,i,j}$ form a data pair to obtain (W×H) data pairs; and then the (W×H) data pairs are linearly fitted, a relationship between a quadratic polynomial $a_f$ and a quadratic polynomial coefficient $b_f$ is obtained, the relationship is defined as $a_f=k_{f,a}\times b_f+c_{f,a}$ here, both $k_{f,a}$ and $c_{f,a}$ are coefficients obtained by fitting;

wherein $d_{f,i,j}$ and $b_{f,i,j}$ form a data pair to obtain (W×H) data pairs; and then the (W×H) data pairs are linearly fitted, a relationship between a quadratic polynomial coefficient $d_f$ and a quadratic polynomial coefficient $b_f$ is obtained, the relationship is defined as $d_f=k_{f,d}\times b_f+c_{f,d}$, here, both $k_{f,d}$ and $c_{f,d}$ are coefficients obtained by fitting;

wherein $a_{g,i,j}$ and $b_{g,i,j}$ form a data pair to obtain (W×H) data pairs; and then the (W×H) data pairs are linearly fitted, a relationship between a quadratic polynomial $a_g$ and a quadratic polynomial coefficient $b_g$ is obtained, the relationship is defined as $a_g=k_{g,a}\times b_g+c_{g,a}$, here, both $k_{g,a}$ and $c_{g,a}$ are coefficients obtained by fitting;

wherein $d_{g,i,j}$ and $b_{g,i,j}$ form a data pair to obtain (W×H) data pairs; and then the (W×H) data pairs are linearly fitted, a relationship between a quadratic polynomial coefficient $d_g$ and a quadratic polynomial coefficient $b_g$ is obtained, the relationship is defined as $d_g=k_{g,d}\times b_g+c_{g,d}$, here, both $k_{g,d}$ and $c_{g,d}$ are coefficients obtained by fitting;

defining $$B = \begin{bmatrix} b_{f,1,1} & b_{f,1,2} & \cdots & b_{f,1,H} & b_{f,2,1} & \cdots & b_{f,W,H} \\ b_{g,1,1} & b_{g,1,2} & \cdots & b_{g,1,H} & b_{g,2,1} & \cdots & b_{g,W,H} \\ 1 & 1 & \cdots & 1 & 1 & \cdots & 1 \end{bmatrix} \text{ and}$$

$$C = \begin{bmatrix} x_{1,1,1} & x_{1,2,1} & \cdots & x_{1,H,1} & x_{2,1,1} & \cdots & x_{W,H,1} \\ y_{1,1,1} & y_{1,2,1} & \cdots & y_{1,H,1} & y_{2,1,1} & \cdots & y_{W,H,1} \\ 1 & 1 & \cdots & 1 & 1 & \cdots & 1 \end{bmatrix},$$

and then defining $M=B\cdot C^{-1}$;

(12) placing the object to be measured on a top surface of the lifting platform, making the object to be measured perpendicular to the optical axis of the optical microscope; and then positioning the aperture of the diaphragm at the position of $T_L$ through controlling the sliding base, saving a current image of the object to be measured and taking as a first image; and then controlling the sliding base to move the diaphragm right horizontally for the distance of 2L, positioning the aperture of the diaphragm at the position of $T_R$, saving a current image of the object to be measured and taking as a second image; and then through a stereo matching algorithm, three-dimensionally matching the first image with the second image, obtaining a disparity map between the first image and the second image, recording the disparity map as $I_d$, wherein a size of all the first image, the second image and the $I_d$ is $M_d\times N_d$;

(13) defining $\Delta u=G(x_d,y_d)$, wherein $\Delta z_d$ represents a corresponding focal plane moving distance of the $I_d$, $\Delta z_d=a\Delta u^2+b\Delta u+c$; obtaining a value of $\Delta z_d$ based on the $\Delta u=G(x_d,y_d)$ and the $\Delta z_d=a\Delta u^2+b\Delta u+c$, wherein $G(x_d,y_d)$ represent gray values of a pixel point with coordinate positions of $(x_d,y_d)$ in the $I_d$, $1\leq x_d\leq M_d$, $1\leq y_d\leq N_d$;

based on $a_f=k_{f,a}\times b_f+c_{f,a}$, $d_f=k_{f,d}\times b_f+c_{f,d}$, $a_g=k_{g,a}\times b_g+c_{g,a}$, $a_g=k_{g,a}\times b_g+c_{g,a}$ and $$\begin{cases} u = a_f\times\Delta z^2 + b_f\times\Delta z + d_f \\ v = a_g\times\Delta z^2 + b_g\times\Delta z + d_g \end{cases},$$

obtaining $$\begin{cases} b_f = (u - c_{f,a}\times\Delta z^2 - c_{f,d})/(k_{f,a}\times\Delta z^2 + \Delta z + k_{f,d}) \\ b_g = (v - c_{g,a}\times\Delta z^2 - c_{g,d})/(k_{g,a}\times\Delta z^2 + \Delta z + k_{g,d}) \end{cases};$$

based on $u=x_d$, $v=y_d$, $\Delta z=\Delta z_d$, the $$\begin{cases} b_f = (u - c_{f,a}\times\Delta z^2 - c_{f,d})/(k_{f,a}\times\Delta z^2 + \Delta z + k_{f,d}) \\ b_g = (v - c_{g,a}\times\Delta z^2 - c_{g,d})/(k_{g,a}\times\Delta z^2 + \Delta z + k_{g,d}) \end{cases},$$

obtaining values of $b_f$ and $b_g$, and respectively recording as $b_f(x_d,y_d)$ and $b_g(x_d,y_d)$;

calculating $$\begin{bmatrix} x(x_d, y_d) \\ y(x_d, y_d) \\ 1 \end{bmatrix} = M^{-1} \begin{bmatrix} b_f(x_d, y_d) \\ b_g(x_d, y_d) \\ 1 \end{bmatrix},$$

obtaining coordinate values $x(x_d,y_d)$ of x and coordinate values $y(x_d,y_d)$ of y, wherein $M^{-1}$ is an inverse array of M;

based on $x=x(x_d,y_d)$, $y=y(x_d,y_d)$ and $z=b_1+b_2x+b_3y$, obtaining an intermediate value of z and recording as $z_0$; and then calculating coordinate values of the z, recording as $z(x_d,y_d)$, wherein $z(x_d,y_d)=z_0-\Delta z_d$;

taking $(x(x_d,y_d), y(x_d,y_d), z(x_d,y_d))$ as three-dimensional coordinates of a reconstructed space point; and

(14) reconstructing three-dimensional coordinates of all space points using all pixel points in the $I_d$ based on the step (13), and obtaining a three-dimensional reconstruction map.

Compared with the prior art, the present invention has advantages as follows.

(1) The present invention adds the diaphragm into the existing optical microscopic imaging system to limit light irradiation angle during imaging for reducing the diameter of blur circle, which extends the depth of field and the depth measurement range, so as to achieve the three-dimensional measurement of large-size objects to be measured.

(2) In the present invention, through changing the position of the added diaphragm, two images with different light incident directions are obtained, which is similar to binocular stereo vision, and then the disparity map is used to predict the depth, so as to carry out the 3D scene reconstruction.

(3) Since the depth of field of the imaging system is enlarged and the imaging model has certain non-linear characteristics, the present invention uses quadratic function to express the non-linearity, which reduces the measurement error.

DETAILED DESCRIPTION OF THE PREFERRED EMBODIMENT

The present invention is further described in detailed with accompanying drawings and embodiments as follows.

Figure 1:
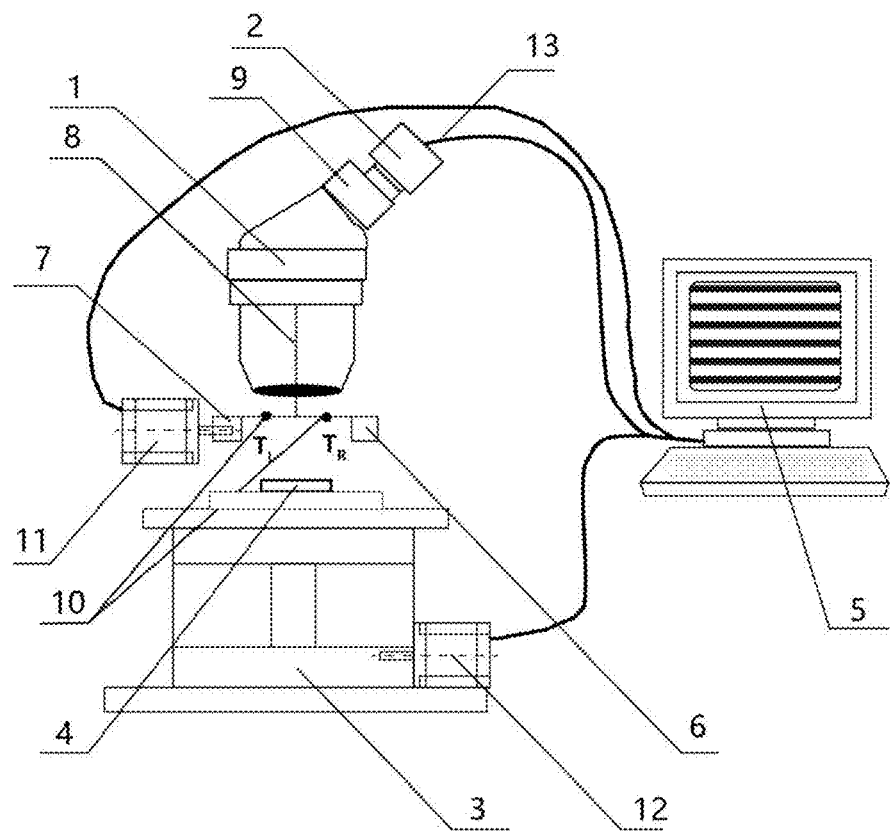
FIG. 1 is a structurally schematic diagram of a microscopic three-dimensional measurement system based on a moving diaphragm provided by the present invention.

The present invention provides a microscopic three-dimensional measurement system based on a moving diaphragm, as shown in FIG. 1, which comprises an optical microscope 1, a camera 2 which is installed on the optical microscope 1 and is aligned with an eyepiece 9 of the optical microscope 1, a lifting platform 3 for horizontally placing a dot calibration board 4, and a computer 5, wherein the optical microscope 1 is disposed above the dot calibration board 4 for allowing the eyepiece of the optical microscope 1 to just face towards the dot calibration board 4, an output end 13 of the camera 2 is connected with the computer 5, a drive motor 12 of the lifting platform 3 is connected with the computer 5; a diaphragm 6, which is able to horizontally move, is disposed between the eyepiece of the optical microscope 1 and the dot calibration board 4;

an optical axis 8 of the optical microscope 1 coincides with a moving trajectory of the lifting platform 3, is perpendicular to both the dot calibration board 4 and a moving trajectory of the diaphragm 6.

In this embodiment, the microscopic three-dimensional measurement system further comprises a sliding base 7 for driving the diaphragm 6 to horizontally move, a drive motor 11 of the sliding base 7 is connected with the computer 5.

Figure 2:
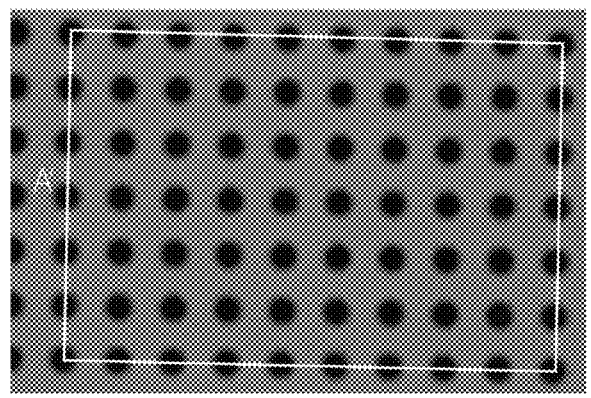
FIG. 2 is a schematic diagram of a determined A' on a dot calibration board.
Figure 3:
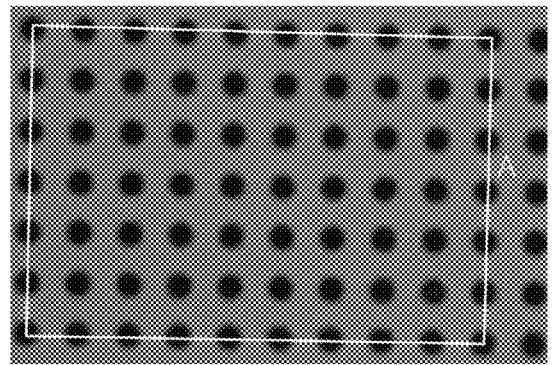
FIG. 3 is a schematic diagram of a determined A on a dot calibration board.
Figure 4:
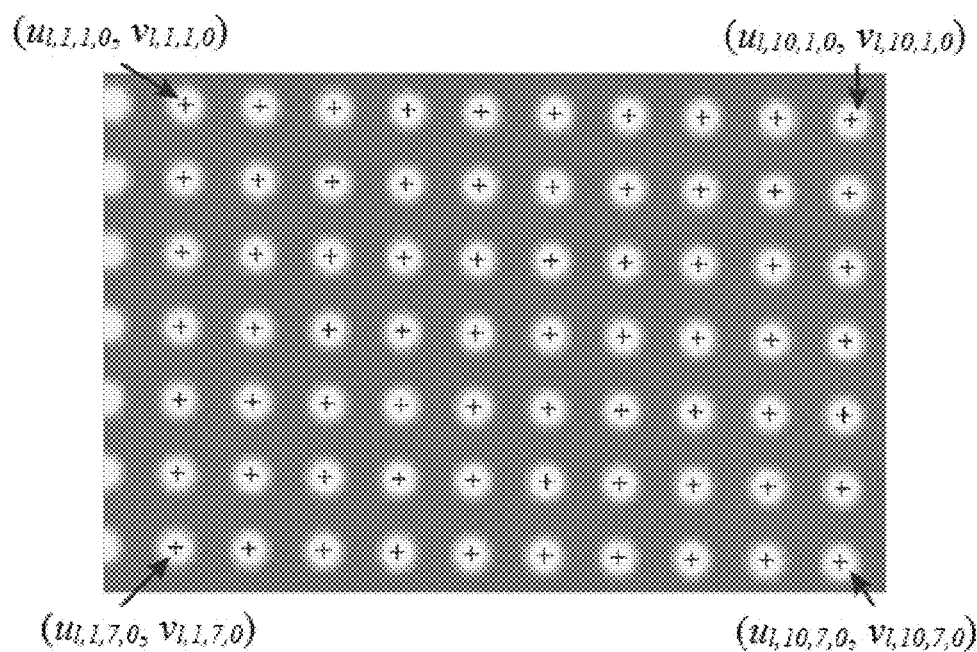
FIG. 4 shows final coordinate positions of centers of all solid dot areas within the rectangular area corresponding to A in $S_{0,T_L}$.
Figure 5:
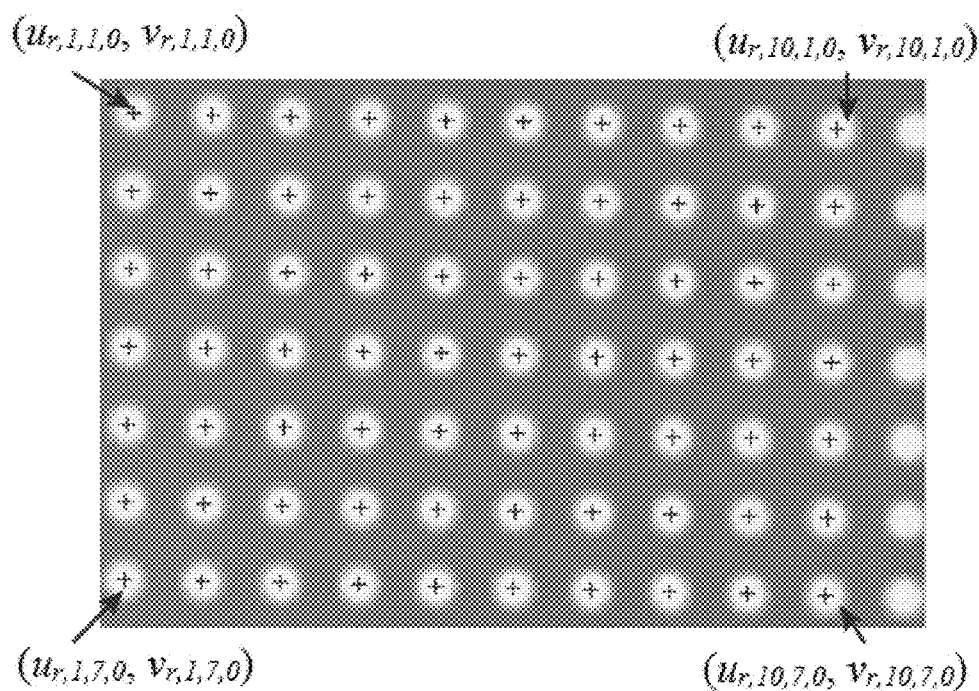
FIG. 5 shows final coordinate positions of centers of all solid dot areas within the rectangular area corresponding to A in $S_{0,T_R}$.

Also, the present invention provides a microscopic three-dimensional measurement method based on a moving diaphragm, which comprises steps of:

(1) coinciding an optical axis of an optical microscope with a moving trajectory of a lifting platform; horizontally placing a dot calibration board on a top surface of the lifting platform and allowing the dot calibration board to be perpendicular to the optical axis of the optical microscope; allowing a moving trajectory of a diaphragm installed on a sliding base to be perpendicular to the optical axis of the optical microscope; placing the diaphragm between an eyepiece of the optical microscope and the dot calibration board, wherein a center distance between two adjacent solid dots in the dot calibration board is defined as e, a diameter of every solid dot in the dot calibration board is defined as d, d<e, a unit of both the d and the e is mm, a diameter of an aperture 10 of the diaphragm is defined as D, $D \in [1,5]$, and a unit of the D is mm;

wherein: there are twenty solid dots in a horizontal array and twenty solid dots in a vertical array on an upper surface of the selected dot calibration board in experiment, that is, there are totally 20×20 solid dots in arrays on the upper surface of the dot calibration board, d is equal to 0.5 mm, e is equal to 1 mm, and D=2 mm in the experiment;

(2) determining an initial position of the aperture of the diaphragm, which comprises positioning a center of the aperture of the diaphragm on the optical axis of the optical microscope through controlling the sliding base; moving left horizontally the diaphragm for a distance L through controlling the sliding base, which means that a distance between the center of the aperture of the diaphragm and the optical axis of the optical microscope is L; determining a current position of the center of the aperture of the diaphragm to be the initial position of the aperture of the diaphragm and recording as $T_L$, wherein $L \in [2, 4]$, a unit of the L is mm and L=3 mm in the experiment;

determining an initial position of the dot calibration board, which comprises controlling the lifting platform to drive the dot calibration board to move vertically and stopping the vertical movement of the lifting platform when a dot calibration board image observed by an observer from a computer is the clearest; controlling the lifting platform to drive the dot calibration board to move vertically and upwardly, stopping the vertical and upward movement of the lifting platform when the dot calibration board image observed by the observer from the computer changes from the clearest to just fuzzy, recording a current vertical upward moving distance of the lifting platform as $Z_S$, determining a current position of the dot calibration board to be the initial position of the dot calibration board and recording as $P_0$, wherein a unit of the $Z_S$ is mm; in the experiment, after the dot calibration board image is the clearest, the lifting platform is controlled to move vertically and upwardly for a distance of $Z_S$=8 mm, the dot calibration board image changes from the clearest to just fuzzy;

(3) when the dot calibration board is at the initial position $P_0$, respectively placing four tiny markers at four solid dots on the dot calibration board; making a shape, formed by taking centers of the four solid dots where the four tiny markers are as vertexes, always a rectangle; the observer observing the dot calibration board image displayed by the computer; moving the four tiny markers; displaying the rectangle, which is defined by taking centers of the four solid dots where the four tiny markers are as vertexes, in the dot calibration board image with a largest area and recording as A', wherein an amount of columns of solid dots in a width direction of the A' on the dot calibration board is 10, and an amount of rows of solid dots in a height direction of the A' on the dot calibration board is 7, as shown in FIG. 2;

(4) controlling the sliding base to move right horizontally the diaphragm for a distance of 2L and recording a current position of the aperture of the diaphragm as $T_R$; the observer observing the dot calibration board image displayed by the computer; moving the four tiny markers; displaying a rectangle which is formed by taking the centers of the four solid dots where the four tiny markers are as vertexes in the dot calibration board image with a largest area and recording as A, saving a current dot calibration board image and recording as $S_{0,T_R}$; and then controlling the sliding base to move left horizontally the diaphragm for a distance of 2L, positioning the aperture of the diaphragm at a position of $T_L$, saving a current dot calibration board image and recording as $S_{0,T_L}$, wherein: after moving left horizontally the diaphragm for the distance of 2L, a rectangle which is formed by taking centers of four solid dots where the four tiny markers are as vertexes is still in the dot calibration board image, so the four tiny markers are moved no longer, the A is included in the A', an amount of columns of solid dots in a width direction of the A on the dot calibration board is defined as W, and an amount of rows of solid dots in a height direction of the A on the dot calibration board is defined as H, which means that there are totally W×H solid dots of the A on the dot calibration board, both the W and the H are positive integers; in the experiment, the amount of the columns of the solid dots in the width direction of the A on the dot calibration board is W=10, and the amount of the rows of the solid dots in the height direction of the A on the dot calibration board is H=7, as shown in FIG. 3; it can be seen from FIGS. 2 and 3 that an area of the A is equal to an area of the A';

(5) taking a top left corner vertex of the A on the dot calibration board as a coordinate origin O, wherein an X positive axis is defined by pointing to centers of solid dots at a same row, a Y positive axis is defined by pointing to centers of solid dots at a same column, a vertically downwardly moving direction of the lifting platform is defined as a Z positive axis, so as to establish a three-dimensional coordinate system OXYZ;

respectively performing binary processing on the $S_{0,T_L}$ and the $S_{0,T_R}$, obtaining binary images respectively corresponding to the $S_{0,T_L}$ and the $S_{0,T_R}$; processing the binary images of the $S_{0,T_L}$ through an existing region growing algorithm, obtaining both every solid dot region and multiple candidate coordinate positions of a center of the every solid dot region in the $S_{0,T_L}$; similarly, processing the binary images of the $S_{0,T_R}$ through the existing region growing algorithm, obtaining both every solid dot region and multiple candidate coordinate positions of a center of the every solid dot region in the $S_{0,T_R}$; and then determining any one of the multiple candidate coordinate positions of the center of the every solid dot region within a rectangle area in the $S_{0,T_L}$ corresponding to the A, to a final coordinate position of the center of the solid dot region; recording a final coordinate position of a center of a $i^{th}$ column and $j^{th}$ row solid dot region within the rectangle area in the $S_{0,T_L}$ corresponding to the A as $(u_{l,i,j,0}, v_{l,i,j,0})$; similarly, determining any one of the multiple candidate coordinate positions of the center of the every solid dot region within a rectangle area in the $S_{0,T_R}$ corresponding to the A, to a final coordinate position of the center of the solid dot region; recording a final coordinate position of a center of a $i^{th}$ column and $j^{th}$ row solid dot region within the rectangle area in the $S_{0,T_R}$ corresponding to the A as $(u_{r,i,j,0}, v_{r,i,j,0})$, wherein: both the i and the j are positive integers, 1≤i≤W, 1≤j≤H FIG. 4 shows final coordinate positions of centers of all solid dot regions within the rectangle in the $S_{0,T_L}$ corresponding to the A, FIG. 5 shows final coordinate positions of centers of all solid dot regions within the rectangle in the $S_{0,T_R}$ corresponding to the A;

(6) controlling the lifting platform to drive dot calibration board to move vertically and downwardly for a distance of Δα, recording a current position of the dot calibration board as $P_1$, recording a current dot calibration board image and recording as $S_{1,T_L}$; and then controlling the lifting platform to move right horizontally the diaphragm for a distance of 2L, positioning the aperture of the diaphragm at a position of $T_R$, saving a current dot calibration board image and recording as $S_{1,T_R}$; and then controlling the lifting platform to move left horizontally the diaphragm for a distance of 2L, positioning the aperture of the diaphragm at a position of $T_L$, wherein $\Delta\alpha \in (Z_S/100, Z_S/50)$, a unit of the Δα is mm; in the experiment, Δα=0.1 mm;

(7) respectively performing binary processing on the $S_{1,T_L}$ and the $S_{1,T_R}$ obtaining binary images respectively corresponding to the $S_{1,T_L}$ and the $S_{1,T_R}$; processing the binary images of the $S_{1,T_L}$ through the existing region growing algorithm, obtaining both every solid dot region and multiple candidate coordinate positions of a center of the every solid dot region in the $S_{1,T_L}$; similarly, processing the binary images of the $S_{1,T_R}$ through the existing region growing algorithm, obtaining both every solid dot region and multiple candidate coordinate positions of a center of the every solid dot region in the $S_{1,T_R}$; and then according to the multiple candidate coordinate positions of the center of the every solid dot region within a rectangle area in the $S_{1,T_L}$ corresponding to the A, determining a final coordinate position of the center of the every solid dot region within the rectangle area in the $S_{1,T_L}$ corresponding to the A; recording a final coordinate position of a center of a $i^{th}$ column and $j^{th}$ row solid dot region within the rectangle area in the $S_{1,T_L}$ corresponding to the A as $(u_{l,i,j,1}, v_{l,i,j,1})$, wherein the $(u_{l,i,j,1}, v_{l,i,j,1})$ is a candidate coordinate position with a smallest Euclidean distance to the $(u_{l,i,j,0}, v_{l,i,j,0})$ in the multiple candidate coordinate positions of the center of the $i^{th}$ column and $j^{th}$ row solid dot region within the rectangle area in the $S_{1,T_L}$ corresponding to the A; similarly, according to the multiple candidate coordinate positions of the center of the every solid dot region within a rectangle area in the $S_{1,T_R}$ corresponding to the A, determining a final coordinate position of the center of the every solid dot region within the rectangle area in the $S_{1,T_R}$ corresponding to the A; recording a final coordinate position of a center of a $i^{th}$ column and $j^{th}$ row solid dot region within the rectangle area in the $S_{1,T_R}$ corresponding to the A as $(u_{r,i,j,1}, v_{r,i,j,1})$, wherein the $(u_{l,i,j,1}, v_{l,i,j,1})$ is a candidate coordinate position with a smallest Euclidean distance to the $(u_{r,i,j,0}, v_{r,i,j,0})$ in the multiple candidate coordinate positions of the center of the $i^{th}$ column and $j^{th}$ row solid dot region within the rectangle area in the $S_{1,T_R}$ corresponding to the A;

calculating three-dimensional coordinates on the three-dimensional coordinate system OXYZ of a center of every solid dot within the A on the dot calibration board after the lifting platform driving the dot calibration board to firstly move vertically and downwardly for a distance of $\Delta\alpha$, recording three-dimensional coordinates on the three-dimensional coordinate system OXYZ of a center of a $i^{th}$ column and $j^{th}$ row solid dot within the A on the dot calibration board after the lifting platform driving the dot calibration board to firstly move vertically and downwardly for the distance of $\Delta\alpha$ as $(x_{i,j,1}, y_{i,j,1}, z_{i,j,1})$, wherein $x_{i,j,1}=(i-1)\times e$, $y_{i,j,1}=(j-1)\times e$ and $z_{i,j,1}=1\times\Delta\alpha$; and then calculating a multi-aperture imaging bias corresponding to every solid dot within the A on the dot calibration board after the lifting platform driving the dot calibration board to firstly move vertically and downwardly for the distance of $\Delta\alpha$, recording a multi-aperture imaging bias corresponding to a $i^{th}$ column and $j^{th}$ row solid dot within the A on the dot calibration board after the lifting platform driving the dot calibration board to firstly move vertically and downwardly for the distance of $\Delta\alpha$ as $\Delta u_{i,j,1}$, here, $\Delta u_{i,j,1}=u_{l,i,j,1}-u_{r,i,j,1}$, wherein $x_{i,j,1}, y_{i,j,1}, z_{i,j,1}$, respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to firstly move vertically and downwardly for the distance of $\Delta\alpha$;

(8) repeating the steps (6) and (7) for (N−1) times, recording a current position of the dot calibration board as $P_k$ after the lifting platform drives the dot calibration board to move downwardly and vertically for $\Delta\alpha$ at a $k^{th}$ time, recording a current dot calibration board image as $S_{k,T_L}$; recording a dot calibration board image as $S_{k,T_R}$ after moving right horizontally the diaphragm for 2L; recording a final coordinate positions of a center of a $i^{th}$ column and $j^{th}$ row solid dot region within a rectangle area in the $S_{k,T_L}$ corresponding to the A as $(u_{l,i,j,k}, v_{l,i,j,k})$, wherein the $(u_{l,i,j,k}, v_{l,i,j,k})$ is a candidate coordinate position with a smallest Euclidean distance to the $(u_{l,i,j,k-1}, v_{l,i,j,k-1})$ in multiple candidate coordinate positions of the center of the $i^{th}$ column and $j^{th}$ row solid dot region within the rectangle area in the $S_{k,T_R}$ corresponding to the A; recording a final coordinate positions of a center of a $i^{th}$ column and $j^{th}$ row solid dot region within a rectangle area in the $S_{k,T_R}$ corresponding to the A as $(u_{r,i,j,k}, v_{r,i,j,k})$, wherein the $(u_{r,i,j,k}, v_{r,i,j,k})$ is a candidate coordinate position with a smallest Euclidean distance to the $(u_{r,i,j,k-1}, v_{r,i,j,k-1})$ in multiple candidate coordinate positions of the center of the $i^{th}$ column and $j^{th}$ row solid dot region within the rectangle area in the $S_{k,T_R}$ corresponding to the A; recording three-dimensional coordinates on the three-dimensional coordinate system OXYZ of a center of a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $(x_{i,j,k}, y_{i,j,k}, z_{i,j,k})$, wherein $x_{i,j,k}=(i-1)\times e$, $y_{i,j,k}=(j-1)\times e$ and $z_{i,j,k}=k\times\Delta\alpha$; and then recording a multi-aperture imaging bias corresponding to a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $\Delta u_{i,j,k}$, here, $\Delta u_{i,j,k}=u_{l,i,j,k}-u_{r,i,j,k}$, wherein N is a positive integer, $$N = \left\lfloor 2 \times \frac{Z_S}{\Delta\alpha} \right\rfloor,$$

"$\lfloor\ \rfloor$" represents a round downward operator, in the experiment, $$N = \left\lfloor 2 \times \frac{Z_S}{\Delta\alpha} \right\rfloor = \left\lfloor 2 \times \frac{8}{0.1} \right\rfloor = 160,$$

k is a positive integer, $1 \leq k \leq N$, $x_{i,j,k}, y_{i,j,k}, z_{i,j,k}$, respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to move vertically and downwardly at the $k^{th}$ time for the distance of $\Delta\alpha$;

(9) forming a data pair by combining the Z-axis coordinate on the three-dimensional coordinate system OXYZ of the center of every solid dot within the A on the dot calibration board after the lifting platform driving the dot calibration board to move vertically and downwardly every time for the distance of $\Delta\alpha$, with a corresponding multi-aperture imaging bias, recording the data pair formed by the $z_{i,j,k}$ and the $\Delta u_{i,j,k}$ as $(z_{i,j,k}, \Delta u_{i,j,k})$; and then through a quadratic polynomial (such as polyfit function in matlab), fitting N data pairs corresponding to every solid dot within the A on the dot calibration board, obtaining W×H relationships between the Z-axis coordinate on the three-dimensional coordinate system of the center of every solid dot within the A on the dot calibration board and a corresponding multi-aperture imaging bias, defining a relationship between the Z-axis coordinate $z_{i,j}$ on the three-dimensional coordinate system of the center of the $i^{th}$ column and $j^{th}$ row solid dot within the A on the dot calibration board and a corresponding multi-aperture imaging bias $\Delta u_{i,j}$ as $z_{i,j}=a_{i,j}\Delta u_{i,j}^2+b_{i,j}\Delta u_{i,j}+c_{i,j}$, wherein all of the $a_{i,j}$, the $b_{i,j}$ and the $c_{i,j}$ are coefficients obtained by fitting, there are totally (W×H) coefficients, wherein the coefficients obtained by fitting in the experiment are as follows:

$a_{i,j}$:

| −0.00961 | −0.0096  | −0.00964 | −0.00958 | −0.00958 | −0.00957 | −0.00956 | −0.0096  | −0.0096  | −0.00965 |
|----------|----------|----------|----------|----------|----------|----------|----------|----------|----------|
| −0.00958 | −0.00964 | −0.00961 | −0.00958 | −0.00956 | −0.00956 | −0.00956 | −0.0096  | −0.0096  | −0.00968 |
| −0.0096  | −0.00965 | −0.00966 | −0.00961 | −0.00955 | −0.00955 | −0.00957 | −0.00959 | −0.00962 | −0.00966 |
| −0.0096  | −0.00969 | −0.00961 | −0.00962 | −0.00959 | −0.00953 | −0.00963 | −0.00961 | −0.00958 | −0.00961 |
| −0.00963 | −0.00968 | −0.00965 | −0.00961 | −0.00958 | −0.00959 | −0.00958 | −0.00962 | −0.00958 | −0.00966 |
| −0.00965 | −0.00965 | −0.00969 | −0.00964 | −0.0096  | −0.00958 | −0.00954 | −0.00961 | −0.00965 | −0.00961 |
| −0.0097  | −0.00964 | −0.00964 | −0.00966 | −0.00966 | −0.00963 | −0.00957 | −0.0096  | −0.00965 | −0.00965 |

$b_{i,j}$:

| 24.83339 | 24.8516  | 24.88844 | 24.87788 | 24.88734 | 24.89163 | 24.87441 | 24.87593 | 24.86716 | 24.85142 |
|----------|----------|----------|----------|----------|----------|----------|----------|----------|----------|
| 24.84147 | 24.85505 | 24.88535 | 24.88658 | 24.88992 | 24.89163 | 24.8849  | 24.87489 | 24.86526 | 24.86709 |
| 24.84489 | 24.87328 | 24.84345 | 24.88832 | 24.89727 | 24.90436 | 24.88557 | 24.87556 | 24.86509 | 24.8562  |
| 24.85058 | 24.87775 | 24.88554 | 24.87997 | 24.89715 | 24.89413 | 24.88574 | 24.87641 | 24.86283 | 24.85096 |
| 24.85257 | 24.87851 | 24.88056 | 24.89459 | 24.89183 | 24.90372 | 24.88639 | 24.8775  | 24.86363 | 24.85499 |
| 24.86275 | 24.87129 | 24.87489 | 24.90061 | 24.89573 | 24.89983 | 24.89117 | 24.87087 | 24.86188 | 24.84953 |
| 24.86099 | 24.85875 | 24.87774 | 24.89924 | 24.89612 | 24.89734 | 24.88754 | 24.87342 | 24.85497 | 24.84557 |

$c_{i,j}$:

| 8707.143 | 8699.579 | 8690.631 | 8681.277 | 8677.786 | 8676.766 | 8674.264 | 8671.414 | 8672.015 | 8669.033 |
|----------|----------|----------|----------|----------|----------|----------|----------|----------|----------|
| 8713.259 | 8707.069 | 8695.824 | 8687.93  | 8682.237 | 8678.059 | 8675.34  | 8672.187 | 8673.513 | 8678.021 |
| 8723.347 | 8715.544 | 8701.178 | 8696.167 | 8687.479 | 8682.676 | 8678.895 | 8677.755 | 8683.217 | 8684.188 |
| 8734.714 | 8725.511 | 8707.566 | 8700.457 | 8696.685 | 8689.52  | 8688.212 | 8689.241 | 8694.18  | 8694.097 |
| 8745.906 | 8733.868 | 8719.69  | 8710.663 | 8705.266 | 8700.975 | 8698.997 | 8703.131 | 8707.286 | 8708.989 |
| 8758.818 | 8745.963 | 8736.928 | 8724.119 | 8719.096 | 8715.395 | 8713.612 | 8717.242 | 8722.915 | 8722.619 |
| 8773.964 | 8761.481 | 8753.725 | 8744.4   | 8736.065 | 8734.078 | 8733     | 8732.323 | 8737.393 | 8739.263 | calculating a corresponding focal plane moving distance of every solid dot within the A on the dot calibration board after the lifting platform drives the dot calibration board to move downwardly and vertically every time for a distance of $\Delta\alpha$, recording a corresponding focal plane moving distance of the $i^{th}$ column and $j^{th}$ row solid dot within the A on the dot calibration board as $\Delta z_{i,j,k}$ after the lifting platform drives the dot calibration board to move vertically and downwardly at the $k^{th}$ time for the distance of $\Delta\alpha$, here, $\Delta z_{i,j,k} = z_{i,j,k} - c_{i,j}$; and then forming a data pair by combining a corresponding focal plane moving distance of every solid dot within the A on the dot calibration board after the lifting platform drives the dot calibration board to move vertically and downwardly every time for the distance of $\Delta\alpha$, with a corresponding multi-aperture imaging bias, recording the data pair formed by the $\Delta z_{i,j,k}$ and $\Delta u_{i,j,k}$ as $(\Delta z_{i,j,k}, \Delta u_{i,j,k})$; and then through a quadratic polynomial (such as polyfit function in matlab), fitting N×W×H data pairs corresponding to all solid dots within the A on the dot calibration board, obtaining a relationship between a focal plane moving distance $\Delta z$ corresponding to any point on the dot calibration board and a corresponding multi-aperture imaging bias $\Delta u$, defining the relationship as $\Delta z \Delta z = a\Delta u^2 + b\Delta u + c$, wherein all of the a, the b and the c are coefficients obtained by fitting, a quadratic polynomial of the $\Delta z$ and the $\Delta u$ obtained by fitting in the experiment is $\Delta z = 0.0096\Delta u^2$ 24.8756 $\Delta u - 0.0027$;

according to the X-axis coordinate and the Y-axis coordinate on the three-dimensional coordinate system OXYZ of the center of every solid dot within the A on the dot calibration board after the lifting platform firstly drives the dot calibration board to move vertically and downwardly for the distance of $\Delta\alpha$, determining (W×H) three-dimensional scattered points and three-dimensional coordinates of an $i^{th}$ column and $j^{th}$ row three-dimensional scattered point to $(x_{i,j,1}, y_{i,j,1}, c_{i,j})$; and then through a plane fitting method (such as createSurfaceFit function in matlab), plane-fitting the (W×H) three-dimensional scattered points, obtaining a space plane with an equation of $z = b_1 + b_2 x + b_3 y$, here, all of the $b_1$, the $b_2$ and the $b_3$ are coefficients obtained by fitting, (x,y,z) presents three-dimensional coordinates of space points in the three-dimensional coordinate system OXYZ, the x,y,z respectively represent an X-axis coordinate, a Y-axis coordinate and a Z-axis coordinate of every space point in the three-dimensional coordinate system OXYZ, an equation of the space plane obtained by fitting in the experiment is $z = 8.6943 \times 10^3 + 0.0041x + 0.0104y$;

(10) determining a relationship, between corresponding coordinate positions (u,v) of any obtained point in the dot calibration board images and on the dot calibration board when the aperture of the diaphragm is at a position of $T_L$ after the lifting platform drives the dot calibration board move vertically and downwardly every time for the distance of $\Delta\alpha$, and a corresponding focal plane moving distance $\Delta z$ of the point on the dot calibration board, defining the relationship between the (u,v) and the $\Delta z$ as $$\begin{cases} u = a_f \times \Delta z^2 + b_f \times \Delta z + d_f \\ v = a_g \times \Delta z^2 + b_g \times \Delta z + d_g \end{cases},$$

here, $1 \leq u \leq W'$, $1 \leq v \leq H'$, W' represents a width of an obtained dot calibration board image when the aperture of the diaphragm is at a position of $T_L$ after the lifting platform drives the dot calibration board move vertically and downwardly every time for the distance of $\Delta\alpha$, H' represents a height thereof, all of the $a_f$, $b_f$, $d_f$, $a_g$, $b_g$ and $d_g$ are quadratic polynomial coefficients;

forming a data pair by combining an X-coordinate of a final coordinate position of a center of every solid dot region within a rectangle area corresponding to the A in the obtained dot calibration board image after the lifting platform drives the dot calibration board to move vertically and downwardly every time for the distance of $\Delta\alpha$, with a corresponding focal plane moving distance of every solid dot within the A on the dot calibration board, recording the data pair formed by $u_{l,i,j,k}$ and $\Delta z_{i,j,k}$ as $(u_{l,i,j,k}, \Delta z_{i,j,k})$; and then through a quadratic polynomial (such as polyfit function in matlab), fitting N data pairs corresponding to every solid dot of both every solid dot region within a rectangle area corresponding to the A in the dot calibration board image and within the A on the dot calibration board, obtaining a relationship between an X-coordinate of a final coordinate position of a center of every solid region within a rectangle area corresponding to the A in the dot calibration board image, and a corresponding focal plane moving distance of every solid dot within the A on the dot calibration board; defining a relationship between an X-coordinate $u_{l,i,j}$ of a final coordinate position of a center of an $i^{th}$ column and $j^{th}$ row solid region within the rectangle area corresponding to the A in the dot calibration board image, and a corresponding focal plane moving distance $\Delta z_{i,j}$ of the $i^{th}$ column and $j^{th}$ row solid dot within the A on the dot calibration board as $u_{l,i,j}=a_{f,i,j}\times\Delta z_{i,j}^{2}+b_{f,i,j}\times\Delta z_{i,j}+d_{f,i,j}$, here, all of the $a_{f,i,j}$, $b_{f,i,j}$, and $d_{f,i,j}$ are coefficients obtained by fitting, there are totally (W×H) coefficients;

forming a data pair by combining a Y-coordinate of the final coordinate position of the center of every solid dot region within the rectangle area corresponding to the A in the obtained dot calibration board image after the lifting platform drives the dot calibration board to move vertically and downwardly every time for the distance of $\Delta\alpha$, with the corresponding focal plane moving distance of every solid dot within the A on the dot calibration board, recording the data pair formed by $v_{l,i,j,k}$ and $\Delta z_{i,j,k}$ as $(v_{l,i,j,k},\Delta z_{i,j,k})$; and then through the quadratic polynomial (such as polyfit function in matlab), fitting N data pairs corresponding to every solid dot of both every solid dot region within the rectangle area corresponding to the A in the dot calibration board image and within the A on the dot calibration board, obtaining a relationship between a Y-coordinate of the final coordinate position of the center of every solid region within the rectangle area corresponding to the A in the dot calibration board image, and the corresponding focal plane moving distance of every solid dot within the A on the dot calibration board; defining a relationship between a Y-coordinate $v_{l,i,j}$ of the final coordinate position of the center of the $i^{th}$ column and $j^{th}$ row solid region within the rectangle area corresponding to the A in the dot calibration board image, and the corresponding focal plane moving distance $\Delta z_{i,j}$ of the $i^{th}$ column and $j^{th}$ row solid dot within the A on the dot calibration board as $v_{l,i,j}=a_{g,i,j}\times\Delta z_{i,j}^{2}+b_{g,i,j}\times\Delta z_{i,j}+d_{g,i,j}$, here, all of the $a_{g,i,j}$, $b_{g,i,j}$ and $d_{g,i,j}$ are coefficients obtained by fitting, there are totally (W×H) coefficients, wherein coefficients obtained by fitting in the experiment are as follows:

$a_{f,i,j}$:

| | | | | |
|---|---|---|---|---|
| −0.0000002682 | −0.0000001684 | −0.0000000678 | 0.0000000331 | 0.0000001308 |
| −0.0000002731 | −0.0000001711 | −0.0000000685 | 0.0000000304 | 0.0000001291 |
| −0.0000002736 | −0.0000001733 | −0.0000000688 | 0.0000000295 | 0.0000001251 |
| −0.0000002747 | −0.0000001736 | −0.0000000731 | 0.0000000287 | 0.0000001250 |
| −0.0000002776 | −0.0000001761 | −0.0000000741 | 0.0000000241 | 0.0000001231 |
| −0.0000002797 | −0.0000001776 | −0.0000000764 | 0.0000000223 | 0.0000001223 |
| −0.0000002799 | −0.0000001802 | −0.0000000784 | 0.0000000196 | 0.0000001203 |

| | | | | |
|---|---|---|---|---|
| 0.0000002300 | 0.0000003309 | 0.0000004354 | 0.0000005332 | 0.0000006341 |
| 0.0000002283 | 0.0000003273 | 0.0000004317 | 0.0000005315 | 0.0000006364 |
| 0.0000002253 | 0.0000003242 | 0.0000004253 | 0.0000005329 | 0.0000006310 |
| 0.0000002227 | 0.0000003241 | 0.0000004254 | 0.0000005257 | 0.0000006299 |
| 0.0000002211 | 0.0000003218 | 0.0000004240 | 0.0000005248 | 0.0000006269 |
| 0.0000002186 | 0.0000003172 | 0.0000004203 | 0.0000005170 | 0.0000006232 |
| 0.0000002177 | 0.0000003140 | 0.0000004172 | 0.0000005212 | 0.0000006210 |

$b_{f,i,j}$:

| | | | | | | | | | |
|---|---|---|---|---|---|---|---|---|---|
| −0.01959 | −0.01278 | −0.00595 | 0.000864 | 0.007635 | 0.014376 | 0.021167 | 0.027991 | 0.034825 | 0.04164 |
| −0.01976 | −0.01294 | −0.00611 | 0.000704 | 0.007472 | 0.014223 | 0.020998 | 0.027813 | 0.034655 | 0.041469 |
| −0.01992 | −0.0131 | −0.00626 | 0.000545 | 0.007314 | 0.014052 | 0.020829 | 0.027647 | 0.034489 | 0.041315 |
| −0.02007 | −0.01327 | −0.00642 | 0.000401 | 0.007147 | 0.013899 | 0.020665 | 0.027488 | 0.03433 | 0.04116 |
| −0.02023 | −0.01342 | −0.00658 | 0.00022 | 0.006988 | 0.013734 | 0.020494 | 0.027331 | 0.03417 | 0.040999 |
| −0.0204 | −0.01359 | −0.00675 | 5.94E−05 | 0.006832 | 0.013569 | 0.020334 | 0.027176 | 0.034015 | 0.04085 |
| −0.02058 | −0.01375 | −0.00693 | −0.00012 | 0.00666 | 0.013409 | 0.020183 | 0.027014 | 0.033881 | 0.040697 |

$d_{f,i,j}$:

| | | | | | | | | | |
|---|---|---|---|---|---|---|---|---|---|
| 698.9545 | 1134.878 | 1572.476 | 2008.914 | 2443.186 | 2876.134 | 3310.072 | 3747.182 | 4185.173 | 4621.562 |
| 689.1317 | 1124.921 | 1562.612 | 1998.906 | 2433.094 | 2866.039 | 3299.88 | 3736.804 | 4174.782 | 4611.323 |
| 679.1408 | 1114.871 | 1552.657 | 1988.847 | 2423.023 | 2855.954 | 3289.692 | 3726.677 | 4164.635 | 4601.131 |
| 669.0325 | 1104.787 | 1542.628 | 1978.914 | 2412.937 | 2845.889 | 3279.56 | 3716.629 | 4154.602 | 4591.048 |
| 658.8592 | 1094.625 | 1532.379 | 1968.695 | 2402.749 | 2835.829 | 3269.479 | 3706.539 | 4144.648 | 4581.085 |
| 648.4953 | 1084.403 | 1522.107 | 1958.427 | 2392.582 | 2825.688 | 3259.446 | 3696.561 | 4134.529 | 4571.239 |
| 637.9991 | 1073.984 | 1511.646 | 1948.148 | 2382.355 | 2815.532 | 3249.388 | 3686.574 | 4124.729 | 4561.426 |

$a_{g,i,j}$:

| | | | | |
|---|---|---|---|---|
| −0.0000002751 | −0.0000002724 | −0.0000002705 | −0.0000002668 | −0.0000002620 |
| −0.0000001782 | −0.0000001763 | −0.0000001694 | −0.0000001719 | −0.0000001677 |
| −0.0000000789 | −0.0000000770 | −0.0000000743 | −0.0000000678 | −0.0000000652 |
| 0.0000000239 | 0.0000000266 | 0.0000000278 | 0.0000000304 | 0.0000000295 |
| 0.0000001211 | 0.0000001252 | 0.0000001268 | 0.0000001274 | 0.0000001303 |
| 0.0000002236 | 0.0000002259 | 0.0000002264 | 0.0000002293 | 0.0000002301 |
| 0.0000003210 | 0.0000003226 | 0.0000003253 | 0.0000003274 | 0.0000003284 |

| | | | | |
|---|---|---|---|---|
| −0.0000002627 | −0.0000002607 | −0.0000002600 | −0.0000002556 | −0.0000002562 |
| −0.0000001649 | −0.0000001626 | −0.0000001622 | −0.0000001591 | −0.0000001568 |

-continued

| | | | | |
|---|---|---|---|---|
| −0.0000000662 | −0.0000000611 | −0.0000000598 | −0.0000000580 | −0.0000000557 |
| 0.0000000353 | 0.0000000349 | 0.0000000398 | 0.0000000418 | 0.0000000423 |
| 0.0000001336 | 0.0000001370 | 0.0000001395 | 0.0000001405 | 0.0000001441 |
| 0.0000002350 | 0.0000002357 | 0.0000002375 | 0.0000002416 | 0.0000002460 |
| 0.0000003257 | 0.0000003325 | 0.0000003348 | 0.0000003381 | 0.0000003419 |

$b_{g,i,j}$:

| | | | | | | | | | |
|---|---|---|---|---|---|---|---|---|---|
| −0.01792 | −0.01774 | −0.01758 | −0.01741 | −0.01724 | −0.01709 | −0.01693 | −0.01678 | −0.01662 | −0.01647 |
| −0.01113 | −0.01096 | −0.01077 | −0.01063 | −0.01046 | −0.01029 | −0.01013 | −0.00999 | −0.00983 | −0.00968 |
| −0.00432 | −0.00415 | −0.004 | −0.00383 | −0.00366 | −0.00351 | −0.00335 | −0.00318 | −0.00304 | −0.00287 |
| 0.002485 | 0.002635 | 0.002804 | 0.002962 | 0.003123 | 0.003288 | 0.003439 | 0.0036 | 0.003761 | 0.003917 |
| 0.009283 | 0.009445 | 0.009607 | 0.009764 | 0.009908 | 0.010069 | 0.01024 | 0.010393 | 0.010551 | 0.010719 |
| 0.016098 | 0.016254 | 0.016409 | 0.016567 | 0.016716 | 0.016864 | 0.017026 | 0.017197 | 0.017358 | 0.01754 |
| 0.022897 | 0.023056 | 0.023202 | 0.023348 | 0.023483 | 0.023647 | 0.023812 | 0.023975 | 0.024146 | 0.024317 |

Figure 6A:
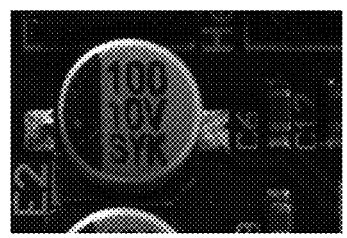
FIG. 6a is a collected image of an object to be measured.
Figure 6B:
FIG. 6b is another collected image of the object to be measured.
Figure 6C:
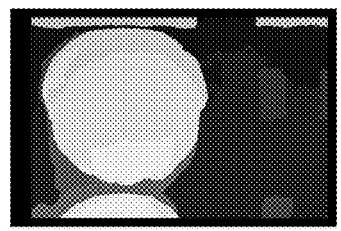
FIG. 6c is a disparity map of FIGS. 6a and 6b.

$d_{g,i,j}$:

| | | | | | | | | | |
|---|---|---|---|---|---|---|---|---|---|
| 360.4958 | 370.7643 | 381.2076 | 391.4 | 401.4607 | 411.376 | 421.1094 | 431.0625 | 440.8661 | 450.7236 |
| 796.7715 | 806.9556 | 817.4735 | 827.484 | 837.4645 | 847.3911 | 857.2331 | 867.185 | 876.7994 | 886.7162 |
| 1232.478 | 1242.557 | 1252.793 | 1262.807 | 1272.793 | 1282.678 | 1292.483 | 1302.416 | 1312.132 | 1322.156 |
| 1668.586 | 1678.645 | 1688.814 | 1698.655 | 1708.618 | 1718.492 | 1728.351 | 1738.236 | 1748.025 | 1757.997 |
| 2104.283 | 2114.246 | 2124.2 | 2133.953 | 2143.747 | 2153.571 | 2163.468 | 2173.443 | 2183.315 | 2193.393 |
| 2540.621 | 2550.345 | 2560.311 | 2569.959 | 2579.764 | 2589.515 | 2599.321 | 2609.464 | 2619.382 | 2629.605 |
| 2976.576 | 2986.161 | 2996.019 | 3005.602 | 3015.243 | 3024.984 | 3034.917 | 3044.903 | 3055.041 | 3065.332 | wherein $a_{f,i,j}$ and $b_{f,i,j}$ form a data pair to obtain (W×H) data pairs; and then the (W×H) data pairs are linearly fitted (through the polyfit function in matlab), a relationship between a quadratic polynomial $a_f$ and a quadratic polynomial coefficient $b_f$ is obtained, the relationship is defined as $a_f = k_{f,a} \times b_f + c_{f,a}$, here, both $k_{f,a}$ and $c_{f,a}$ are coefficients obtained by fitting;

wherein $d_{f,i,j}$ and $b_{f,i,j}$ form a data pair to obtain (W×H) data pairs; and then the (W×H) data pairs are linearly fitted (through the polyfit function in matlab), a relationship between a quadratic polynomial coefficient $d_f$ and a quadratic polynomial coefficient $b_f$ is obtained, the relationship is defined as $d_f = k_{f,d} \times b_f + c_{f,d}$, here, both $k_{f,d}$ and $c_{f,d}$ are coefficients obtained by fitting;

wherein $a_{g,i,j}$ and $b_{g,i,j}$ form a data pair to obtain (W×H) data pairs; and then the (W×H) data pairs are linearly fitted (through the polyfit function in matlab), a relationship between a quadratic polynomial coefficient $a_g$ and a quadratic polynomial coefficient $b_g$ is obtained, the relationship is defined as $a_g = k_{g,a} \times b_g + c_{g,a}$, here, both $k_{g,a}$ and $c_{g,a}$ are coefficients obtained by fitting;

wherein $d_{g,i,j}$ and $b_{g,i,j}$ form a data pair to obtain (W×H) data pairs; and then the (W×H) data pairs are linearly fitted (through the polyfit function in matlab), a relationship between a quadratic polynomial coefficient $d_g$ and a quadratic polynomial coefficient $b_g$ is obtained, the relationship is defined as $d_g = k_{g,d} \times b_g + c_{g,d}$ here, both $k_{g,d}$ and $c_{g,d}$ are coefficients obtained by fitting;

the coefficients obtained by fitting in the experiment are as follows: $k_{f,a} = 1.4731 \times 10^{-5}$, $c_{f,a} = 2.0620 \times 10^{-8}$, $k_{f,d} = 6.4068 \times 10^4$, $c_{f,d} = 1.9548 \times 10^3$, $k_{g,a} = 1.4615 \times 10^{-5}$, $c_{g,a} = 1.3818 \times 10^{-8}$, $k_{g,d} = 6.4117 \times 10^4$ and $c_{g,d} = 1.5078 \times 10^3$;

defining $$B = \begin{bmatrix} b_{f,1,1} & b_{f,1,2} & \cdots & b_{f,1,H} & b_{f,2,1} & \cdots & b_{f,W,H} \\ b_{g,1,1} & b_{g,1,2} & \cdots & b_{g,1,H} & b_{g,2,1} & \cdots & b_{g,W,H} \\ 1 & 1 & \cdots & 1 & 1 & \cdots & 1 \end{bmatrix} \text{ and }$$

$$C = \begin{bmatrix} x_{1,1,1} & x_{1,2,1} & \cdots & x_{1,H,1} & x_{2,1,1} & \cdots & x_{W,H,1} \\ y_{1,1,1} & y_{1,2,1} & \cdots & y_{1,H,1} & y_{2,1,1} & \cdots & y_{W,H,1} \\ 1 & 1 & \cdots & 1 & 1 & \cdots & 1 \end{bmatrix},$$

and then defining $M = B \cdot C^{-1}$, wherein $$M = \begin{bmatrix} 6.7977 \times 10^{-6} & -1.6149 \times 10^{-7} & -0.0196 \\ 1.5935 \times 10^{-7} & 6.7953 \times 10^{-6} & -0.0179 \\ 0 & 0 & 1 \end{bmatrix}$$

in the experiment;

(12) placing the object to be measured on a top surface of the lifting platform, making the object to be measured perpendicular to the optical axis of the optical microscope; and then positioning the aperture of the diaphragm at the position of $T_L$ through controlling the sliding base, saving a current image of the object to be measured and taking as a first image; and then controlling the sliding base to move the diaphragm right horizontally for the distance of 2L, positioning the aperture of the diaphragm at the position of $T_R$, saving a current image of the object to be measured and taking as a second image; and then through a stereo matching algorithm (such as disparity function in matlab), three-dimensionally matching the first image with the second image, obtaining a disparity map between the first image and the second image, recording the disparity map as $I_d$, wherein a size of all the first image, the second image and the $I_d$ is $M_d \times N_d$, the first image collected in the experiment is shown in FIG. 6a, the second image collected in the experiment is shown in FIG. 6b, the obtained disparity map is shown in FIG. 6c, all of which has a size of 1296×864;

(13) defining $\Delta u = G(x_d, y_d)$, wherein $\Delta z_d$ represents a corresponding focal plane moving distance of the $I_d$, $\Delta z_d = a\Delta u^2 + b\Delta u + c$; obtaining a value of $\Delta z_d$ based on the $\Delta u = G(x_d, y_d)$ and the $\Delta z_d = a\Delta u^2 + b\Delta u + c$, wherein $G(x_d, y_d)$ represent gray values of a pixel point with coordinate positions of $(x_d, y_d)$ in the $I_d$, $1 \leq x_d \leq M_d$, $1 \leq y_d \leq N_d$;

based on $a_f = k_{f,a} \times b_f + c_{f,a}$, $d_f = k_{f,a} \times b_f + c_{f,d}$, $a_g = k_{g,a} \times b_g + c_{g,a}$, $a_g = k_{g,a} \times b_g + c_{g,a}$ and $$\begin{cases} u = a_f \times \Delta z^2 + b_f \times \Delta z + d_f \\ v = a_g \times \Delta z^2 + b_g \times \Delta z + d_g \end{cases},$$

obtaining $$\begin{cases} b_f = (u - c_{f,a} \times \Delta z^2 - c_{f,d}) / (k_{f,a} \times \Delta z^2 + \Delta z + k_{f,d}) \\ b_g = (v - c_{g,a} \times \Delta z^2 - c_{g,d}) / (k_{g,a} \times \Delta z^2 + \Delta z + k_{g,d}) \end{cases};$$

based on $u = x_d$, $v = y_d$, $\Delta z = \Delta z_d$, the $$\begin{cases} b_f = (u - c_{f,a} \times \Delta z^2 - c_{f,d}) / (k_{f,a} \times \Delta z^2 + \Delta z + k_{f,d}) \\ b_g = (v - c_{g,a} \times \Delta z^2 - c_{g,d}) / (k_{g,a} \times \Delta z^2 + \Delta z + k_{g,d}) \end{cases},$$

obtaining values of $b_f$ and $b_g$, and respectively recording as $b_f(x_d, y_d)$ and $b_g(x_d, y_d)$;

calculating $$\begin{bmatrix} x(x_d, y_d) \\ y(x_d, y_d) \\ 1 \end{bmatrix} = M^{-1} \begin{bmatrix} b_f(x_d, y_d) \\ b_g(x_d, y_d) \\ 1 \end{bmatrix},$$

obtaining coordinate values $x(x_d, y_d)$ of x and coordinate values $y(x_d, y_d)$ of y, wherein $M^{-1}$ is an inverse array of M;

based on $x = x(x_d, y_d)$, $y = y(x_d, y_d)$ and $z = b_1 + b_2 x + b_3 y$, obtaining an intermediate value of z and recording as $z_0$; and then calculating coordinate values of the z, recording as $z(x_d, y_d)$ wherein $z(x_d, y_d) = z_0 - \Delta z_d$;

taking $(x(x_d, y_d), y(x_d, y_d), z(x_d, y_d))$ as three-dimensional coordinates of a reconstructed space point; and

Figure 6D:
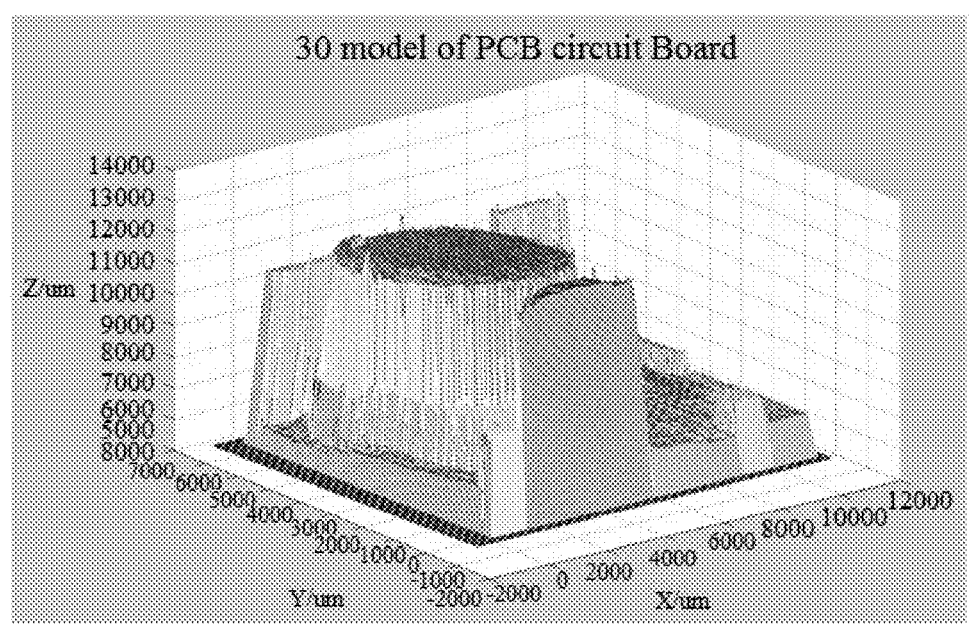
FIG. 6d is a three-dimensional reconstruction map of the object to be measured.

(14) reconstructing three-dimensional coordinates of all space points using all pixel points in the $I_d$ based on the step (13), and obtaining a three-dimensional reconstruction map, wherein FIG. 6d shows the three-dimensional reconstruction map of the object to be measured.

What is claimed is:

1. A microscopic three-dimensional measurement system based on a moving diaphragm comprising: an optical microscope, a camera installed on the optical microscope aligned with an eyepiece of the optical microscope, a lifting platform for horizontally placing a dot calibration board, and a computer, wherein the optical microscope is disposed above the dot calibration board for allowing the eyepiece of the optical microscope to just face towards the dot calibration board, an output end of the camera is connected with the computer, a drive motor of the lifting platform is connected with the computer; a diaphragm, which is able to horizontally move, is disposed between the eyepiece of the optical microscope and the dot calibration board; an optical axis of the optical microscope coincides with a moving trajectory of the lifting platform, is perpendicular to both the dot calibration board and a moving trajectory of the diaphragm.

2. The microscopic three-dimensional measurement system, as recited in claim 1, further comprising a sliding base for driving the diaphragm to horizontally move, wherein a drive motor of the sliding base is connected with the computer.

3. A microscopic three-dimensional measurement method with a microscopic three-dimensional measurement system based on a moving diaphragm, wherein:

the microscopic three-dimensional measurement system comprises an optical microscope, a camera installed on the optical microscope aligned with an eyepiece of the optical microscope, a lifting platform for horizontally placing a dot calibration board, and a computer, wherein the optical microscope is disposed above the dot calibration board for allowing the eyepiece of the optical microscope to just face towards the dot calibration board, an output end of the camera is connected with the computer, a drive motor of the lifting platform is connected with the computer; the moving diaphragm, which is able to horizontally move, is disposed between the eyepiece of the optical microscope and the dot calibration board;

the method comprises steps of:

(1) coinciding an optical axis of the optical microscope with a moving trajectory of the lifting platform; horizontally placing the dot calibration board on a top surface of the lifting platform and allowing the dot calibration board to be perpendicular to the optical axis of the optical microscope; allowing a moving trajectory of the diaphragm installed on a sliding base to be perpendicular to the optical axis of the optical microscope; placing the diaphragm between the eyepiece of the optical microscope and the dot calibration board, wherein a center distance between two adjacent solid dots in the dot calibration board is defined as e, a diameter of every solid dot in the dot calibration board is defined as d, d<e, a unit of both the d and the e is mm, a diameter of an aperture of the diaphragm is defined as D, D∈[1,5], and a unit of the D is mm;

(2) determining an initial position of the aperture of the diaphragm, which comprises positioning a center of the aperture of the diaphragm on the optical axis of the optical microscope through controlling the sliding base; moving the diaphragm left horizontally for a distance L through controlling the sliding base, which means that a distance between the center of the aperture of the diaphragm and the optical axis of the optical microscope is L; determining a current position of the center of the aperture of the diaphragm to be the initial position of the aperture of the diaphragm and recording as $T_L$, wherein L ∈[2,4], and a unit of the L is mm;

determining an initial position of the dot calibration board, which comprises controlling the lifting platform to drive the dot calibration board to move vertically and stopping the vertical movement of the lifting platform when a dot calibration board image observed by an observer from the computer is the clearest; controlling the lifting platform to drive the dot calibration board to move vertically and upwardly, stopping the vertical and upward movement of the lifting platform when the dot calibration board image observed by the observer from the computer changes from the clearest to just fuzzy, recording a current vertical upward moving distance of the lifting platform as $Z_s$, determining a current position of the dot calibration board to be the initial position of the dot calibration board and recording as $P_0$, wherein a unit of the $Z_s$ is mm;

(3) when the dot calibration board is at the initial position $P_0$, respectively placing four tiny markers at four solid dots on the dot calibration board; making a shape, formed by taking centers of the four solid dots where the four tiny markers are as vertexes, always a rectangle; the observer observing the dot calibration board image displayed by the computer; moving the four tiny markers; displaying the rectangle, which is defined by taking centers of the four solid dots where the four tiny markers are as vertexes, in the dot calibration board image with a largest area and recording as A';

(4) controlling the sliding base to move the diaphragm right horizontally for a distance of 2L and recording a current position of the aperture of the diaphragm as $T_R$; and then the observer observing the dot calibration board image displayed by the computer; moving the four tiny markers; displaying the rectangle, which is defined by taking the centers of the four solid dots where the four tiny markers are as vertexes, in the dot calibration board image with a largest area and recording as A, saving a current dot calibration board image and recording as $S_{0,T_R}$; and then controlling the sliding base to move the diaphragm left horizontally for a distance of 2L, positioning the aperture of the diaphragm at a position of $T_L$, saving a current dot calibration board image and recording as $S_{0,T_L}$, wherein: the A is included in the A', an amount of columns of solid dots in a width direction of the A on the dot calibration board is defined as W, and an amount of rows of solid dots in a height direction of the A on the dot calibration board is defined as H, which means that there are totally W×H solid dots of the A on the dot calibration board, both the W and the H are positive integers;

(5) taking a top left corner vertex of the A on the dot calibration board as a coordinate origin O, defining an X positive axis by a direction which points at centers of solid dots at a same row, defining a Y positive axis by a direction which points to centers of solid dots at a same column, defining a vertically downwardly moving direction of the lifting platform as a Z positive axis, so as to establish a three-dimensional coordinate system OXYZ;

respectively performing binary processing on the $S_{0,T_L}$ and the $S_{0,T_R}$, obtaining binary images respectively corresponding to the $S_{0,T_L}$ and the $S_{0,T_R}$; processing the binary images of the $S_{0,T_L}$ through a region growing algorithm, obtaining both every solid dot region and multiple candidate coordinate positions of a center of the every solid dot region in the $S_{0,T_L}$; similarly, processing the binary images of the $S_{0,T_R}$ through the region growing algorithm, obtaining both every solid dot region and multiple candidate coordinate positions of a center of the every solid dot region in the $S_{0,T_R}$; and then determining any one of the multiple candidate coordinate positions of the center of the every solid dot region within a rectangle area in the $S_{0,T_L}$ corresponding to the A, to a final coordinate position of the center of the solid dot region; recording a final coordinate position of a center of a $i^{th}$ column and $j^{th}$ row solid dot region within the rectangle area in the $S_{0,T_L}$ corresponding to the A as; $(U_{l,i,j,0}, v_{l,i,j,0})$; similarly, determining any one of the multiple candidate coordinate positions of the center of the every solid dot region within a rectangle area in the $S_{0,T_R}$ corresponding to the A, to a final coordinate position of the center of the solid dot region; recording a final coordinate position of a center of a $i^{th}$ column and $j^{th}$ row solid dot region within the rectangle area in the $S_{0,T_R}$ corresponding to the A as $(U_{r,i,j,0}, v_{r,i,j,0})$, wherein: both the i and the j are positive integers, $1 \le i \le W$, $1 \le j \le H$;

(6) controlling the lifting platform to drive dot calibration board to move vertically and downwardly for a distance of $\Delta \alpha$, recording a current position of the dot calibration board as $P_1$, recording a current dot calibration board image and recording as $S_{1,T_L}$; and then controlling the lifting platform to move right horizontally the diaphragm for a distance of 2L, positioning the aperture of the diaphragm at a position of $T_R$, saving a current dot calibration board image and recording as $S_{1,T_R}$; and then controlling the lifting platform to move left horizontally the diaphragm for a distance of 2L, positioning the aperture of the diaphragm at a position of $T_L$, wherein $\Delta \alpha \in (Z_s/100, Z_s/50)$, a unit of the $\Delta \alpha$ is mm;

(7) respectively performing binary processing on the $S_{1,T_L}$ and the $S_{1,T_R}$, obtaining binary images respectively corresponding to the $S_{1,T_L}$ and the $S_{1,T_R}$; processing the binary images of the $S_{1,T_L}$ through the region growing algorithm, obtaining both every solid dot region and multiple candidate coordinate positions of a center of the every solid dot region in the $S_{1,T_L}$; similarly, processing the binary images of the $S_{1,T_R}$ through the region growing algorithm, obtaining both every solid dot region and multiple candidate coordinate positions of a center of the every solid dot region in the $S_{1,T_R}$; and then according to the multiple candidate coordinate positions of the center of the every solid dot region within a rectangle area in the $S_{1,T_L}$ corresponding to the A, determining a final coordinate position of the center of the every solid dot region within the rectangle area in the $S_{1,T_L}$ corresponding to the A; recording a final coordinate position of a center of a $i^{th}$ column and $j^{th}$ row solid dot region within the rectangle area in the $S_{1,T_L}$ corresponding to the A as $(u_{l,i,j,1}, v_{l,i,j,1})$, wherein the $(u_{l,i,j,1}, v_{l,i,j,1})$ is a candidate coordinate position with a smallest Euclidean distance to the $(u_{l,i,j,0}, v_{l,i,j,0})$ in the multiple candidate coordinate positions of the center of the $i^{th}$ column and $j^{th}$ row solid dot region within the rectangle area in the $S_{1,T_L}$ corresponding to the A; similarly, according to the multiple candidate coordinate positions of the center of the every solid dot region within a rectangle area in the $S_{1,T_R}$ corresponding to the A, determining a final coordinate position of the center of the every solid dot region within the rectangle area in the $S_{1,T_R}$ corresponding to the A;

recording a final coordinate position of a center of a $i^{th}$ column and $j^{th}$ row solid dot region within the rectangle area in the $S_{1,T_R}$ corresponding to the A as $(u_{r,i,j,1}, v_{r,i,j,1})$, wherein the $(u_{r,i,j,1}, v_{r,i,j,1})$ is a candidate coordinate position with a smallest Euclidean distance to the $(u_{r,i,j,0}, v_{r,i,j,0})$ in the multiple candidate coordinate positions of the center of the $i^{th}$ column and $j^{th}$ row solid dot region within the rectangle area in the $S_{1,T_R}$ corresponding to the A;

calculating three-dimensional coordinates on the three-dimensional coordinate system OXYZ of a center of every solid dot within the A on the dot calibration board after the lifting platform driving the dot calibration board to firstly move vertically and downwardly for a distance of $\Delta \alpha$, recording three-dimensional coordinates on the three-dimensional coordinate system OXYZ of a center of a $i^{th}$ column and $j^{th}$ row solid dot within the A on the dot calibration board after the lifting platform driving the dot calibration board to firstly move vertically and downwardly for the distance of $\Delta\alpha$ as $(x_{i,j,1}, y_{i,j,1}, z_{i,j,1})$, wherein $x_{i,j,1}=(i-1)\times e$, $y_{i,j,1}=(j-1)\times e$ and $z_{i,j,1}=1\times\Delta\alpha$; and then calculating a multi-aperture imaging bias corresponding to every solid dot within the A on the dot calibration board after the lifting platform driving the dot calibration board to firstly move vertically and downwardly for the distance of $\Delta\alpha$, recording a multi-aperture imaging bias corresponding to a $i^{th}$ column and $j^{th}$ row solid dot within the A on the dot calibration board after the lifting platform driving the dot calibration board to firstly move vertically and downwardly for the distance of $\Delta\alpha$ as $\Delta u_{i,j,1}$, here, $\Delta u_{i,j,1}=u_{l,i,j,1}-u_{r,i,j,1}$, wherein $x_{i,j,1}, y_{i,j,1}, z_{i,j,1}$ respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to firstly move vertically and downwardly for the distance of $\Delta\alpha$;

(8) repeating the steps (6) and (7) for (N−1) times, recording a current position of the dot calibration board as $P_k$ after the lifting platform drives the dot calibration board to move downwardly and vertically for $\Delta\alpha$ at a $k^{th}$ time, recording a current dot calibration board image as $S_{k,T_L}$; recording a dot calibration board image as $S_{k,T_R}$ after moving right horizontally the diaphragm for 2L; recording a final coordinate positions of a center of a $i^{th}$ column and $j^{th}$ row solid dot region within a rectangle area in the $S_{k,T_L}$ corresponding to the A as $(u_{l,i,j,k}, V_{l,i,j,k})$, wherein the $(u_{l,i,j,k}, V_{l,i,j,k})$ is a candidate coordinate position with a smallest Euclidean distance to the $((u_{l,i,j,k-1}, V_{l,i,j,k-1})$ in multiple candidate coordinate positions of the center of the $i^{th}$ column and $j^{th}$ row solid dot region within the rectangle area in the $S_{k,T_R}$ corresponding to the A; recording a final coordinate positions of a center of a $i^{th}$ column and $j^{th}$ row solid dot region within a rectangle area in the $S_{k,T_R}$ corresponding to the A as $(u_{r,i,j,k}, v_{r,i,j,k})$, wherein the $(u_{r,i,j,k}, v_{r,i,j,k})$ is a candidate coordinate position with a smallest Euclidean distance to the $(u_{r,i,j,k-1}, v_{r,i,j,k-1})$ in multiple candidate coordinate positions of the center of the $i^{th}$ column and $j^{th}$ row solid dot region within the rectangle area in the $S_{k,T_R}$ corresponding to the A; recording three-dimensional coordinates on the three-dimensional coordinate system OXYZ of a center of a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $(x_{i,j,k}, y_{i,j,k}, z_{i,j,k})$, wherein $x_{i,j,k}=(i-1)\times e$, $y_{i,j,k}=(j-1)\times e$ and $z_{i,j,k}=k\times\Delta\alpha$; and then recording a multi-aperture imaging bias corresponding to a $i^{th}$ column and $j^{th}$ row solid dot within the A on the dot calibration board after the lifting platform driving the dot calibration board to move vertically and downwardly at the $k^{th}$ time for the distance of $\Delta\alpha$ as $\Delta u_{i,j,k}$, here, $\Delta u_{i,j,k}=u_{l,i,j,k}-u_{r,i,j,k}$, wherein N is a positive integer, $$N = \left\lfloor 2 \times \frac{Z_S}{\Delta\alpha} \right\rfloor,$$

"$\lfloor\ \rfloor$" represents a round downward operator, k is a positive integer, $1 \leq k \leq N$, $X_{i,j,k}, y_{i,j,k}, z_{i,j,k}$ respectively represent an X-axis coordinate, a Y-axis coordinate and a Z-axis coordinate on the three-dimensional coordinate system OXYZ of the center of the $i^{th}$ column and $j^{th}$ row solid dot within the A on the dot calibration board after the lifting platform driving the dot calibration board to move vertically and downwardly at the $k^{th}$ time for the distance of $\Delta\alpha$;

(9) forming a data pair by combining the Z-axis coordinate on the three-dimensional coordinate system OXYZ of the center of every solid dot within the A on the dot calibration board after the lifting platform driving the dot calibration board to move vertically and downwardly every time for the distance of $\Delta\alpha$, with a corresponding multi-aperture imaging bias, recording the data pair formed by the $z_{i,j,k}$ and the $\Delta u_{i,j,k}$ as $(z_{i,j,k}, \Delta u_{i,j,k})$; and then through a quadratic polynomial, fitting N data pairs corresponding to every solid dot within the A on the dot calibration board, obtaining a relationship between the Z-axis coordinate on the three-dimensional coordinate system of the center of every solid dot within the A on the dot calibration board and a corresponding multi-aperture imaging bias, defining a relationship between the Z-axis coordinate $z_{i,j}$ on the three-dimensional coordinate system of the center of the $i^{th}$ column and $j^{th}$ row solid dot within the A on the dot calibration board and a corresponding multi-aperture imaging bias $\Delta u_{i,j}$ as $z_{i,j}=a_{i,j}\Delta u_{i,j}^2+b_{i,j}\Delta u_{i,j}+c_{i,j}$, wherein all of the $a_{i,j}$, the $b_{i,j}$ and the $c_{i,j}$ are coefficients obtained by fitting, there are totally (W×H) coefficients; calculating a corresponding focal plane moving distance of every solid dot within the A on the dot calibration board after the lifting platform drives the dot calibration board to move downwardly and vertically every time for a distance of $\Delta\alpha$, recording a corresponding focal plane moving distance of the $i^{th}$ column and $j^{th}$ row solid dot within the A on the dot calibration board as $\Delta z_{i,j,k}$ after the lifting platform drives the dot calibration board to move vertically and downwardly at the $k^{th}$ time for the distance of $\Delta\alpha$, here, $\Delta z_{i,j,k}=z_{i,j,k}-c_{i,j}$; and then forming a data pair by combining a corresponding focal plane moving distance of every solid dot within the A on the dot calibration board after the lifting platform drives the dot calibration board to move vertically and downwardly every time for the distance of $\Delta\alpha$, with a corresponding multi-aperture imaging bias, recording the data pair formed by the $\Delta z_{i,j,k}$ and $\Delta u_{i,j,k}$ as $(\Delta z_{i,j,k}, \Delta u_{i,j,k})$; and then through a quadratic polynomial, fitting N×W×H data pairs corresponding to all solid dots within the A on the dot calibration board, obtaining a relationship between a focal plane moving distance $\Delta z$ corresponding to any point on the dot calibration board and a corresponding multi-aperture imaging bias $\Delta u$, defining the relationship as $\Delta z=a\Delta u^2+b\Delta u+c$, wherein all of the a, the b and the c are coefficients obtained by fitting;

according to the X-axis coordinate and the Y-axis coordinate on the three-dimensional coordinate system OXYZ of the center of every solid dot within the A on the dot calibration board after the lifting platform firstly drives the dot calibration board to move vertically and downwardly for the distance of $\Delta\alpha$, determining (W×H) three-dimensional scattered points and three-dimensional coordinates of an $i^{th}$ column and $j^{th}$ row three-dimensional scattered point to $(X_{i,j,1}, y_{i,j,1}, c_{i,j})$; and then through a plane fitting method, plane-fitting the (W×H) three-dimensional scattered points, obtaining a space plane with an equation of $z=b_1+b_2x+b_3y$, here, all of the $b_1$, the $b_2$ and the $b_3$ are coefficients obtained by fitting, (x,y,z) presents three-dimensional coordinates of space points in the three-dimensional coordinate system OXYZ, the x,y,z respectively represent an X-axis coordinate, a Y-axis coordinate and a Z-axis coordinate of every space point in the three-dimensional coordinate system OXYZ;

(10) determining a relationship, between corresponding coordinate positions (u,v) of any obtained point in the dot calibration board images and on the dot calibration board when the aperture of the diaphragm is at a position of $T_L$ after the lifting platform drives the dot calibration board move vertically and downwardly every time for the distance of $\Delta\alpha$, and a corresponding focal plane moving distance $\Delta z$ of the point on the dot calibration board, defining the relationship between the (u, v) and the $\Delta z$ as $$\begin{cases} u = a_f \times \Delta z^2 + b_f \times \Delta z + d_f \\ v = a_g \times \Delta z^2 + b_g \times \Delta z + d_g \end{cases},$$

here $1 \leq u \leq W', 1 \leq v \leq H'$, W' represents a width of an obtained dot calibration board image when the aperture of the diaphragm is at a position of $T_L$ after the lifting platform drives the dot calibration board move vertically and downwardly every time for the distance of $\Delta\alpha$, H' represents a height thereof, all of the $a_f$, $b_f$, $d_f$, $a_g$, $b_g$ and $d_g$ are quadratic polynomial coefficients;

forming a data pair by combining an X-coordinate of a final coordinate position of a center of every solid dot region within a rectangle area corresponding to the A in the obtained dot calibration board image after the lifting platform drives the dot calibration board to move vertically and downwardly every time for the distance of $\Delta\alpha$, with a corresponding focal plane moving distance of every solid dot within the A on the dot calibration board, recording the data pair formed by $u_{l,i,j,k}$ and $\Delta z_{i,j,k}$ as $(u_{l,i,j,k}, \Delta z_{i,j,k})$ and then through a quadratic polynomial, fitting N data pairs corresponding to every solid dot of both every solid dot region within a rectangle area corresponding to the A in the dot calibration board image and within the A on the dot calibration board, obtaining a relationship between an X-coordinate of a final coordinate position of a center of every solid region within a rectangle area corresponding to the A in the dot calibration board image, and a corresponding focal plane moving distance of every solid dot within the A on the dot calibration board; defining a relationship between an X-coordinate $u_{l,i,j}$ of a final coordinate position of a center of an $i^{th}$ column and $j^{th}$ row solid region within the rectangle area corresponding to the A in the dot calibration board image, and a corresponding focal plane moving distance $\Delta z_{i,j}$ of the $i^{th}$ column and $j^{th}$ row solid dot within the A on the dot calibration board as $u_{l,i,j}=a_{f,i,j} \times \Delta z_{i,j}^2 + b_{f,i,j} \times \Delta z_{i,j} + d_{f,i,j}$, here, all of the $a_{f,i,j}$, $b_{f,i,j}$ and $d_{f,i,j}$ are coefficients obtained by fitting, there are totally (W×H) coefficients;

forming a data pair by combining a Y-coordinate of the final coordinate position of the center of every solid dot region within the rectangle area corresponding to the A in the obtained dot calibration board image after the lifting platform drives the dot calibration board to move vertically and downwardly every time for the distance of $\Delta\alpha$, with the corresponding focal plane moving distance of every solid dot within the A on the dot calibration board, recording the data pair formed by $v_{l,i,j,k}$ and $\Delta z_{i,j,k}$ as $(v_{l,i,j,k}, \Delta z_{i,j,k})$; and then through the quadratic polynomial, fitting N data pairs corresponding to every solid dot of both every solid dot region within the rectangle area corresponding to the A in the dot calibration board image and within the A on the dot calibration board, obtaining a relationship between a Y-coordinate of the final coordinate position of the center of every solid region within the rectangle area corresponding to the A in the dot calibration board image, and the corresponding focal plane moving distance of every solid dot within the A on the dot calibration board; defining a relationship between a Y-coordinate $V_{l,i,j}$ of the final coordinate position of the center of the $i^{th}$ column and $j^{th}$ row solid region within the rectangle area corresponding to the A in the dot calibration board image, and the corresponding focal plane moving distance $\Delta z_{i,j}$ of the $i^{th}$ column and $j^{th}$ row solid dot within the A on the dot calibration board as $v_{l,i,j}=a_{g,i,j} \times \Delta z_{i,j}^2 + b_{g,i,j} \times \Delta z_{i,j} + d_{g,i,j}$, here, all of the $a_{g,i,j}$, $b_{g,i,j}$ and $d_{g,i,j}$ are coefficients obtained by fitting, there are totally (W×H) coefficients, wherein $a_{f,i,j}$ and $b_{f,i,j}$ form a data pair to obtain (W×H) data pairs; and then the (W×H) data pairs are linearly fitted, a relationship between a quadratic polynomial $a_f$ and a quadratic polynomial coefficient $b_f$ is obtained, the relationship is defined as $a_f=k_{f,a} \times b_f + c_{f,a}$, here, both $k_{f,a}$ and $c_{f,a}$ are coefficients obtained by fitting;

wherein $d_{f,i,j}$ and $b_{f,i,j}$ form a data pair to obtain (W×H) data pairs; and then the (W×H) data pairs are linearly fitted, a relationship between a quadratic polynomial coefficient $d_f$ and a quadratic polynomial coefficient $b_f$ is obtained, the relationship is defined as $d_f=k_{f,d} \times b_f + c_{f,d}$, here, both $k_{f,d}$ and $c_{f,d}$ are coefficients obtained by fitting;

wherein $a_{g,i,j}$ and $b_{g,i,j}$ form a data pair to obtain (W×H) data pairs; and then the (W×H) data pairs are linearly fitted, a relationship between a quadratic polynomial coefficient $a_g$ and a quadratic polynomial coefficient $b_g$ is obtained, the relationship is defined as $a_g=k_{g,a} \times b_g + c_{g,a}$, here, both $k_{g,a}$ and $c_{g,a}$ are coefficients obtained by fitting;

wherein $d_{g,i,j}$ and $b_{g,i,j}$ form a data pair to obtain (W×H) data pairs; and then the (W×H) data pairs are linearly fitted, a relationship between a quadratic polynomial coefficient $d_g$ and a quadratic polynomial coefficient $b_g$ is obtained, the relationship is defined as $d_g=k_{g,d} \times b_g + c_{g,d}$, here, both $k_{g,d}$ and $c_{g,d}$ are coefficients obtained by fitting;

defining $$B = \begin{bmatrix} b_{f,1,1} & b_{f,1,2} & \cdots & b_{f,1,H} & b_{f,2,1} & \cdots & b_{f,W,H} \\ b_{g,1,1} & b_{g,1,2} & \cdots & b_{g,1,H} & b_{g,2,1} & \cdots & b_{g,W,H} \\ 1 & 1 & \cdots & 1 & 1 & \cdots & 1 \end{bmatrix} \text{ and}$$

$$C = \begin{bmatrix} x_{1,1,1} & x_{1,2,1} & \cdots & x_{1,H,1} & x_{2,1,1} & \cdots & x_{W,H,1} \\ y_{1,1,1} & y_{1,2,1} & \cdots & y_{1,H,1} & y_{2,1,1} & \cdots & y_{W,H,1} \\ 1 & 1 & \cdots & 1 & 1 & \cdots & 1 \end{bmatrix},$$

and then defining $M = B \cdot C^{-1}$;

(11) placing the object to be measured on a top surface of the lifting platform, making the object to be measured perpendicular to the optical axis of the optical microscope; and then positioning the aperture of the diaphragm at the position of $T_L$ through controlling the sliding base, saving a current image of the object to be measured and taking as a first image; and then controlling the sliding base to move the diaphragm right horizontally for the distance of $2_L$, positioning the aperture of the diaphragm at the position of $T_R$, saving a current image of the object to be measured and taking as a second image; and then through a stereo matching algorithm, three-dimensionally matching the first image with the second image, obtaining a disparity map between the first image and the second image, recording the disparity map as $I_d$, wherein a size of all the first image, the second image and the $I_d$ is $M_d \times N_d$;

(12) defining $\Delta u = G(x_d, y_d)$, wherein $\Delta z_d$ represents a corresponding focal plane moving distance of the $I_d$, $\Delta z_d = a\Delta u^2 + b\Delta u + c$; obtaining a value of $\Delta z_d$ based on the $\Delta u = G(x_d, y_d)$ and the $\Delta z_d = a\Delta u^2 + b\Delta u + c$, wherein $G(x_d, y_d)$ represent gray values of a pixel point with coordinate positions of $(x_d, y_d)$ in the $I_d$, $1 \leq x_d \leq M_d$, $1 \leq y_d \leq N_d$;

based on $a_f = k_{f,a} \times b_f + c_{f,a}$, $d_f = k_{f,d} \times b_f + c_{f,d}$, $a_g = k_{g,a} \times b_g + c_{g,a}$, $a_g = k_{g,a} \times b_g + c_{g,a}$ and $$\begin{cases} u = a_f \times \Delta z^2 + b_f \times \Delta z + d_f \\ v = a_g \times \Delta z^2 + b_g \times \Delta z + d_g \end{cases},$$

obtaining $$\begin{cases} b_f = (u - c_{f,a} \times \Delta z^2 - c_{f,d})/(k_{f,a} \times \Delta z^2 + \Delta z + k_{f,d}) \\ b_g = (v - c_{g,a} \times \Delta z^2 - c_{g,d})/(k_{g,a} \times \Delta z^2 + \Delta z + k_{g,d}) \end{cases};$$

based on $u = x_d$, $v = y_d$, $\Delta z = \Delta z_d$, the $$\begin{cases} b_f = (u - c_{f,a} \times \Delta z^2 - c_{f,d})/(k_{f,a} \times \Delta z^2 + \Delta z + k_{f,d}) \\ b_g = (v - c_{g,a} \times \Delta z^2 - c_{g,d})/(k_{g,a} \times \Delta z^2 + \Delta z + k_{g,d}) \end{cases},$$

obtaining values of $b_f$ and $b_g$, and respectively recording as $b_f(x_d, y_d)$ and $b_g(x_d, y_d)$;

calculating $$\begin{bmatrix} x(x_d, y_d) \\ y(x_d, y_d) \\ 1 \end{bmatrix} = M^{-1} \begin{bmatrix} b_f(x_d, y_d) \\ b_g(x_d, y_d) \\ 1 \end{bmatrix},$$

obtaining coordinate values $x(x_d, y_d)$ of x and coordinate values $y(x_d, y_d)$ of y, wherein $M^{-1}$ is an inverse array of M;

based on $x = x(x_d, y_d)$, $Y = y(x_d, y_d)$ and $z = b_1 + b_2 x + b_3 y$, obtaining an intermediate value of z and recording as $z_0$; and then calculating coordinate values of the z, recording as $z(x_d, y_d)$, wherein $z(x_d, y_d) = z_0 - \Delta z_d$;

taking $(x(x_d, y_d), y(x_d, y_d), z(x_d, y_d))$ as three-dimensional coordinates of a reconstructed space point; and

(13) reconstructing three-dimensional coordinates of all space points using all pixel points in the $I_d$ based on the step (12), and obtaining a three-dimensional reconstruction map.

* * * * *